(12) United States Patent
Byun et al.

(10) Patent No.: US 12,386,509 B2
(45) Date of Patent: Aug. 12, 2025

(54) OPERATION METHOD OF HOST CONFIGURED TO CONTROL STORAGE DEVICE AND OPERATION METHOD OF STORAGE SYSTEM

(71) Applicant: SAMSUNG ELECTRONICS CO., LTD., Suwon-si (KR)

(72) Inventors: Jung Gyu Byun, Suwon-si (KR); Woochang Shin, Suwon-si (KR); Gyeongtae Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/416,262

(22) Filed: Jan. 18, 2024

(65) Prior Publication Data
US 2024/0272793 A1    Aug. 15, 2024

(30) Foreign Application Priority Data
Feb. 15, 2023    (KR) .................. 10-2023-0019870

(51) Int. Cl.
*G06F 3/06*    (2006.01)
(52) U.S. Cl.
CPC .......... *G06F 3/0607* (2013.01); *G06F 3/0631* (2013.01); *G06F 3/0679* (2013.01)
(58) Field of Classification Search
CPC .... G06F 3/0607; G06F 3/0631; G06F 3/0679; G06F 3/0604; G06F 3/0623; G06F 3/0629; G06F 3/0644; G06F 3/0656; G06F 3/0658; G06F 3/0614; G06F 3/0659; G06F 2212/1016; G06F 2212/1032
See application file for complete search history.

(56) References Cited

U.S. PATENT DOCUMENTS

| 8,693,245 | B2 | 4/2014 | Park et al. |
| 8,843,697 | B2 | 9/2014 | Kim |
| 10,359,933 | B2 | 7/2019 | Muchherla et al. |
| 10,949,355 | B2 | 3/2021 | Hodes et al. |
| 11,379,280 | B2* | 7/2022 | Sudarmani ............ G06F 9/546 |
| 2012/0155167 | A1 | 6/2012 | Uehara |
| 2015/0220433 | A1 | 8/2015 | Schmidberger |

(Continued)

OTHER PUBLICATIONS

"Universial Flash Storage (UFS)", JEDEC Standard, Version 4.0, JESD220F, Aug. 2022. (489 pages total).

(Continued)

*Primary Examiner* — Khoa D Doan
(74) *Attorney, Agent, or Firm* — Sughrue Mion, PLLC

(57) ABSTRACT

Disclosed is a method of a storage system. The method includes: transmitting, by the host, a first query request to a storage device; transmitting, by the storage device, a first query response to the host; identifying, by the host, a number of first allocation units corresponding to a first logical unit set to a first memory type; transmitting, by the host, a second query request including the number of first allocation units to the storage device; and writing, by the storage device, the number of first allocation units in a configuration descriptor. The first capacity adjustment factor corresponds to a product of a first ratio and a capacity adjustment factor integer modifier, the first ratio being between a first capacity of a normal memory type of the storage device and a second capacity of the first memory type.

20 Claims, 17 Drawing Sheets

(56) References Cited

U.S. PATENT DOCUMENTS

| | | |
|---|---|---|
| 2017/0075812 A1 | 3/2017 | Wu et al. |
| 2020/0192582 A1* | 6/2020 | Jeon ..................... G06F 3/0679 |
| 2022/0253239 A1 | 8/2022 | Jang et al. |
| 2024/0232067 A1* | 7/2024 | Wu ..................... G06F 12/0246 |

OTHER PUBLICATIONS

Extended European Search Report dated Jun. 6, 2024, issued by the European Patent Office in European Application No. 24154816.3.
Anonymous: "Universal Flash Storage (UFS) Version 2.2", JEDEC Standard, JEDEC—JEDEC Solid State Technology Association, 2020, vol. JESD220C-2.2, pp. 1-378 (396 pages total).

* cited by examiner

| | Normal Memory Type (QLC) | Enhanced Memory Type 1 (TLC) | Enhanced Memory Type 2 (MLC) | Enhanced Memory Type 3 (SLC) |
|---|---|---|---|---|
| Capacity Adjustment Factor[1] | 4/4 = 1 | 4/3 = 1.333... | 4/2 = 2 | 4/1 = 4 |

1) CapacityAdjFactor = $Capacity_{NormalMem}$ / $Capacity_{Enhanced}$

FIG. 8

GEOMETRY DESCRIPTOR

| Offset | Size | Name | Value | Description |
|---|---|---|---|---|
| 30h | 2 | wEnhanced1CapAdjFac | Device Specific | Capacity Adjustment Factor for the Enhanced memory type 1. This parameter is the ratio between the capacity obtained with the Normal memory type and the capacity obtained with the Enhanced memory type1 for the same amount of allocation units.<br><br>CapacityAdjFactor = Capacity$_{Normal Mem}$ / Capacity$_{Enhanced}$ * wCapAdjFactIniModifier.<br><br>wEnhanced1CapAdjFac = INTEGER(256 × CapacityAdjFactor) |
| 4Dh | 2 | wCapAdjFactIniModifier | Device Specific | Set wMediumTypeCapAdjFactor to least common multiple of denominators of capacity adjustment factors that are not integer. |

FIG. 9

| | Normal Type (QLC) | Enhanced Memory Type 1 (TLC) | Enhanced Memory Type 2 (MLC) | Enhanced Memory Type 3 (SLC) |
|---|---|---|---|---|
| Capacity Adjustment Factor[1] | 4/4 * 3 = 3 | 4/3 * 3 = 4 | 4/2 * 3 = 6 | 4/1 * 3 = 12 |

1) CapacityAdjFactor = $Capacity_{NormalMem}$ / $Capacity_{Enhanced}$ * wCapAdjFactIntModifier

FIG. 10

| Offset | Size | Name | Value | Description |
|---|---|---|---|---|
| 36h | 2 | wEnhanced2CapAdjFac | Device Specific | Capacity Adjustment Factor for the Enhanced memory type 2. This parameter is the ratio between the capacity obtained with the Normal memory type and the capacity obtained with the Enhanced memory type 2 for the same amount of allocation units.<br><br>$CapacityAdjFactor = Capacity_{NormalMem} / Capacity_{Enhanced2} * wCapAdjFactIntModifier$<br><br>$wEnhanced2CapAdjFac = INTEGER(256 \times CapacityAdjFactor)$ |
| 3Ch | 2 | wEnhanced3CapAdjFac | Device Specific | Capacity Adjustment Factor for the Enhanced memory type 3. This parameter is the ratio between the capacity obtained with the Normal memory type and the capacity obtained with the Enhanced memory type 3 for the same amount of allocation units.<br><br>$CapacityAdjFactor = Capacity_{NormalMem} / Capacity_{Enhanced3} * wCapAdjFactIntModifier$<br><br>$wEnhanced3CapAdjFac = INTEGER(256 \times CapacityAdjFactor)$ |
| 42h | 2 | wEnhanced4CapAdjFac | Device Specific | Capacity Adjustment Factor for the Enhanced memory type 4. This parameter is the ratio between the capacity obtained with the Normal memory type and the capacity obtained with the Enhanced memory type 4 for the same amount of allocation units.<br><br>$CapacityAdjFactor = Capacity_{NormalMem} / Capacity_{Enhanced4} * wCapAdjFactIntModifier$<br><br>$wEnhanced3CapAdjFac = INTEGER(256 \times CapacityAdjFactor)$ |

FIG. 11

| | Normal Type (PLC) | Enhanced Memory Type 1 (QLC) | Enhanced Memory Type 2 (TLC) | Enhanced Memory Type 3 (MLC) | Enhanced Memory Type 4 (SLC) |
|---|---|---|---|---|---|
| Capacity Adjustment Factor[1] | 5/5 = 1 | 5/4 = 1.25 | 5/3 = 1.666... | 5/2 = 2.5 | 5/1 = 5 |
| Capacity Adjustment Factor[2] | 5/5 * 12 = 12 | 5/4 * 12 = 15 | 5/3 * 12 = 20 | 5/2 * 12 = 30 | 5/1 * 12 = 60 |

1) CapacityAdjFactor = $Capacity_{NormalMem}$ / $Capacity_{Enhanced2}$
2) CapacityAdjFactor = $Capacity_{NormalMem}$ / $Capacity_{EnhancedR}$ * wCapAdjFactIntModifier

FIG. 13

GEOMETRY DESCRIPTOR

| Offset | Size | Name | Value | Description |
|---|---|---|---|---|
| 54h | 1 | bWriteBoosterBufferCapAdjFac | Device Specific | For "LU dedicated buffer" mode, the total user space is decreased by the following amount:<br>bWriteBoosterBufferCapAdjFac * dLUNumWriteBoosterBufferAllocUnits * bAllocationUnitSize * dSegmentSize * 512 / wCapAdjFactIntModifier byte.<br>For "shared buffer" mode, the total user space is decreased by by the following amount:<br>bWriteBoosterBufferCapAdjFac * dNumSharedWriteBoosterBufferAllocUnits * bAllocationUnitSize * dSegmentSize * 512 / wCapAdjFactIntModifier byte.<br>The value of this parameter is 6(CapacityAdjFactor(TLC)(3) * CapAdjFactIntModifier(2)) for TLC NAND when SLC mode is used as WriteBooster Buffer. 2(CapacityAdjFactor(MLC)(2) * CapAdjFactIntModifier(1)) for MLC NAND. 12(CapacityAdjFactor(QLC)(4) * CapAdjFactIntModifier(3)) for QLC NAND. |

OPERATION METHOD OF HOST CONFIGURED TO CONTROL STORAGE DEVICE AND OPERATION METHOD OF STORAGE SYSTEM

CROSS-REFERENCE TO RELATED APPLICATION

This application claims priority to Korean Patent Application No. 10-2023-0019870, filed on Feb. 15, 2023, in the Korean Intellectual Property Office, the disclosure of which is incorporated by reference herein in its entirety.

BACKGROUND

The present disclosure relates to a semiconductor memory, and more particularly, to an operation method of a host configured to control a storage device and an operation method of a storage system.

A semiconductor memory may be classified as a volatile memory or a or a nonvolatile memory. The volatile memory may lose data stored therein when a power is turned off, and may be a static random access memory (SRAM) or a dynamic random access memory (DRAM). A nonvolatile memory may retain data stored therein even when a power is turned off, and may be a flash memory, a phase-change RAM (PRAM), a magnetic RAM (MRAM), a resistive RAM (RRAM), or a ferroelectric RAM (FRAM).

A flash memory may be used as a high-capacity storage medium. A storage device refers to a device, which stores data under control of a host device, such as a computer, a smartphone, or a smart pad. The storage device includes a device, which stores data on a magnetic disk, such as a hard disk drive (HDD), or a device, which stores data in a semiconductor memory, in particular, a nonvolatile memory, such as a solid state drive (SSD) or a memory card.

The operating speed of the host device, which communicates with the storage device, such as a computer, a smartphone, or a smart pad continues to improve as semiconductor manufacturing technologies develop. Also, the size of content used in the storage device and the host device of the storage device is increasing. For this reason, the storage device with an improved operating speed is being continuously required.

SUMMARY

Embodiments provide an operation method of a storage device with improved reliability, an operation method of a host, and an operation method of a storage system.

According to an aspect of an embodiment, a method of operating a storage system which includes a host and a storage device, includes: transmitting, by the host, a first query request universal flash storage protocol information unit (UPIU) to the storage device; transmitting, by the storage device, a first query response UPIU corresponding to the first query request UPIU to the host in response to the first query request UPIU; identifying, by the host, a number of first allocation units corresponding to a first logical unit set to a first memory type, based on a first capacity adjustment factor and a capacity adjustment factor integer modifier included in the first query response UPIU; transmitting, by the host, a second query request UPIU including the number of first allocation units to the storage device; and writing, by the storage device, the number of first allocation units in a configuration descriptor and transmitting a second query response UPIU to the host, in response to the second query request UPIU. The first capacity adjustment factor corresponds to a product of a first ratio and the capacity adjustment factor integer modifier, the first ratio being between a first capacity of a normal memory type of the storage device and a second capacity of the first memory type.

According to an aspect of an embodiment, a method of operating a host which is configured to control a storage device, includes: obtaining a geometry descriptor from the storage device; identifying a number of first allocation units for a first logical unit of the storage device, based on a first capacity adjustment factor generated based on a value of each of a first field and a second field included in the geometry descriptor; and writing first information about the identified number of the first allocation units in a configuration descriptor of the storage device. The first logical unit is set to a first memory type which stores "N" bits in each of memory cells of the storage device. The first field includes a value corresponding to a product of the first capacity adjustment factor and a value of the second field.

According to an aspect of an embodiment, a method of operating a host which is configured to control a storage device, includes: obtaining a first enhanced memory type adjustment factor for a first enhanced memory type from the storage device; obtaining a first capacity adjustment factor, based on the first enhanced memory type adjustment factor; calculating a number of first allocation units for a first logical unit of the storage device based on Equation 1 below; and writing the calculated number of the first allocation units in the storage device, $$dNumAllocUnits = \text{CEILING}\left(\frac{LUCapacity \times CapacityAdjFactor}{bAllocationUnitSize \times dSegmentSize \times 512 \times wCapAdjFacIntModifier}\right) \quad \text{[Equation 1]}$$

wherein the "dNumAllocUnits" indicates the number of the first allocation units for the first logical unit, the "bAllocationUnitSize" indicates an allocation unit size, the "dSegmentSize" indicates a segment size, the "LUCapacity" indicates a capacity of the first logical unit, the "CapacityAdjFactor" indicates the first capacity adjustment factor, and the "wCapAdjFacIntModifier" indicates a capacity adjustment factor integer modifier.

According to an aspect of an embodiment, a host device includes: one or more memories storing instructions; and one or more processors configured to execute the instructions to: transmit, to a storage device, a first query request UPIU; receive, from the storage device, a first query response UPIU corresponding to the first query request UPIU in response to the first query request UPIU; identify a number of first allocation units corresponding to a first logical unit set to a first memory type, based on a first capacity adjustment factor and a capacity adjustment factor integer modifier included in the first query response UPIU; transmit, to the storage device, a second query request UPIU including the number of first allocation units to the storage device; and receive, from the storage device, a second query response UPIU indicating the storage device has written the number of first allocation units in a configuration descriptor. The first capacity adjustment factor corresponds to a product of a first ratio and the capacity adjustment factor integer modifier, the first ratio being between a first capacity of a normal memory type of the storage device and a second capacity of the first memory type.

According to an aspect of an embodiment, a storage device includes: one or more memories storing instructions; and one or more processors configured to execute the instructions to: receive, from a host, a first query request UPIU to the storage device; transmit a first query response UPIU corresponding to the first query request UPIU to the host in response to the first query request UPIU; receive, from the host, a second query request UPIU including a number of first allocation units corresponding to a first logical unit set to a first memory type, wherein the number of first allocation units is identified by the host based on a first capacity adjustment factor and a capacity adjustment factor integer modifier included in the first query response UPIU; and write the number of first allocation units in a configuration descriptor and transmit a second query response UPIU to the host, in response to the second query request UPIU. The first capacity adjustment factor corresponds to a product of a first ratio and the capacity adjustment factor integer modifier, the first ratio being between a first capacity of a normal memory type of the storage device and a second capacity of the first memory type.

BRIEF DESCRIPTION OF DRAWINGS

The above and other aspects and features will be more clearly understood from the following description of embodiments, taken in conjunction with the accompanying drawings.

FIG. 8 is a diagram for describing specific fields used in an operation according to the flowchart of FIG. 7 according to an embodiment.

FIG. 9 is a diagram for describing a capacity adjustment factor set according to the flowchart of FIG. 8 according to an embodiment.

FIG. 10 is a diagram for describing a portion of a geometry descriptor set to a storage device of FIG. 1 according to an embodiment.

FIG. 11 is a diagram for describing a capacity adjustment factor set in a storage device of FIG. 1 according to an embodiment.

FIG. 13 is a diagram for describing a specific field used with respect to a write booster buffer of FIG. 12 according to an embodiment.

DETAILED DESCRIPTION

Below, embodiments will be described with reference to the accompanying drawings. Embodiments described herein are provided as examples, and thus, the present disclosure is not limited thereto, and may be realized in various other forms. Each embodiment provided in the following description is not excluded from being associated with one or more features of another example or another embodiment also provided herein or not provided herein but consistent with the present disclosure.

According to a related UFS standard, a capacity adjustment factor (CapacityAdjFactor). used in partition setting of a logical unit, is expressed in the form of a decimal fraction for a specific memory type. In this case, when a floating point operation (FLOP) is not supported between a host and a storage device or by the host, the capacity adjustment factor of a decimal fraction type may be set to any other integer value. An error in calculating the number of allocation units (nNumAllocUnits) of the logical unit may be caused because the capacity adjustment factor is set to an integer value which does not correspond to the capacity adjustment factor associated with the specific memory type.

According to embodiments, the capacity adjustment factor (CapacityAdjFactor) for each of memory types defined in the related UFS standard is multiplied by a capacity adjustment factor integer modifier (wCapAdjFacIntModifier) such that the capacity adjustment factor is expressed in an integer form. The host (e.g., 1100 of FIG. 1) may calculate the number of allocation units for each logical unit by using the capacity adjustment factor integer modifier (wCapAdjFacIntModifier) and the capacity adjustment factor expressed in an integer form. Accordingly, even though a floating point operation is not supported, a normal calculation is possible because factors required for calculating the number of allocation units for each logical unit are expressed in an integer form. Hereinafter, embodiments will be described in detail.

Figure 1:
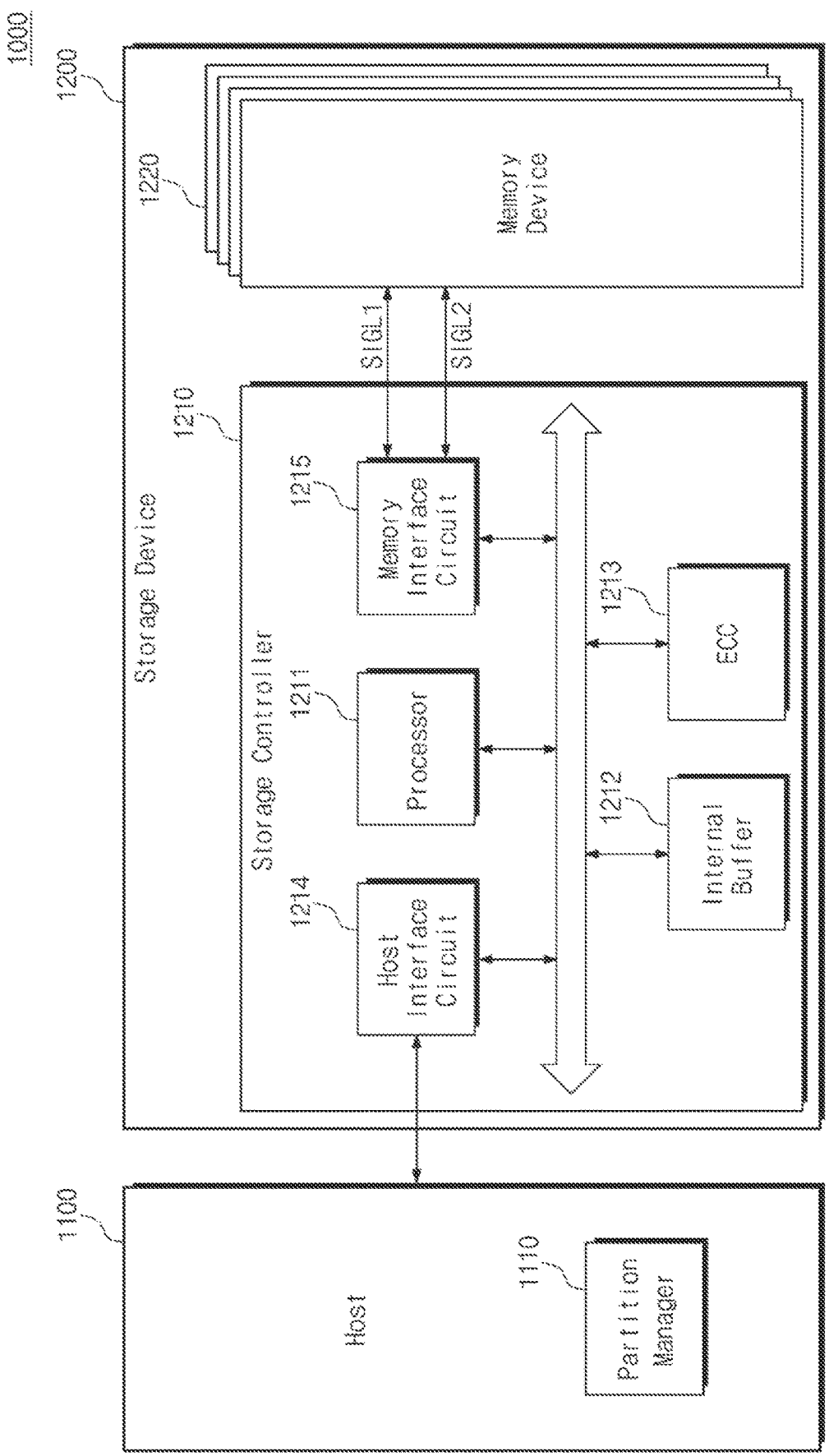
FIG. 1 is a block diagram illustrating a storage system according to an embodiment.

FIG. 1 is a block diagram illustrating a storage system according to an embodiment. Referring to FIG. 1, a storage system 1000 may include a host 1100 and a storage device 1200. In an embodiment, the storage system 1000 may include at least one of various computing systems such as a ultra-mobile PC (UMPC), a workstation, a net-book, personal digital assistants (PDA), a portable computer, a web tablet, a wireless phone, a mobile phone, a smartphone, e-book, a portable multimedia player (PMP), a portable game player, a navigation device, a black box, a digital camera, a digital multimedia broadcasting (DMB) player, a digital audio recorder, a digital audio player, a digital picture recorder, a digital picture player, a digital video recorder, and a digital video player.

The host 1100 may be configured to control the storage device 1200. For example, based on a given interface, the host 1100 may store data in the storage device 1200 or may read data stored in the storage device 1200. In an embodiment, the given interface may be a universal flash storage (UFS) interface. However, the present disclosure is not limited thereto. For example, the given interface may include at least one of various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, an USB (Universal Serial Bus) interface, an SD (Secure Digital) card interface, an MMC (Multi-Media Card) interface, an eMMC (embedded Multi-Media Card) interface, a Universal Flash Storage (UFS) interface, an eUFS (embedded Universal Flash Storage) interface, a CF (Compact Flash) card interface, and a CXL (Compute eXpress Link) interface.

The storage device 1200 may include a storage controller 1210 and a memory device 1220. In an embodiment, the storage device 1200 may be a UFS device complying with the UFS interface standard.

The storage controller 1210 may operate under control of the host 1100. For example, under control of the host 1100, the storage controller 1210 may store data in the memory device 1220 or may provide data stored in the memory device 1220 to the host 1100. In an embodiment, the storage controller 1210 may perform various management operations under control of the host 1100. In an embodiment, the management operations may include an operation of setting a variety of information of the storage device 1200 or providing the set information of the storage device 1200 to the host 1100.

The storage controller 1210 may include a processor 1211, an internal buffer 1212, an error correcting code (ECC) circuit 1213, a host interface circuit 1214, and a memory interface circuit 1215.

The processor 1211 may control an overall operation of the storage controller 1210. For example, the processor 1211 may execute an operating system or firmware for driving the storage controller 1210. The processor 1211 may generate addresses and commands for controlling the memory device 1220, based on a request of the host 1100.

The internal buffer 1212 may temporarily store data to be written in the memory device 1220 or data read from the memory device 1220. The internal buffer 1212 may be configured to store a variety of information necessary for the storage controller 1210 to operate. For example, the internal buffer 1212 may be configured to store a map table for accessing the memory device 1220. In an embodiment, the internal buffer 1212 may include a random access memory. For example, the internal buffer 1212 may include a static random access memory or a dynamic random access memory.

The ECC circuit 1213 may generate parity data by performing ECC encoding on user data to be stored in the memory device 1220. The generated parity data may be stored in the memory device 1220 together with the user data. The ECC circuit 1213 may configured to correct an error of the user data by performing ECC decoding based on the user data and the parity data read from the memory device 1220.

The host interface circuit 1214 may be configured to communicate with the host 1100. In an embodiment, the host interface circuit 1214 may be configured to comply with the given interface, communication protocol, or communication standard between the host 1100 and the storage device 1200. In an embodiment, the host interface circuit 1214 may be configured to comply with the UFS standard.

The memory interface circuit 1215 may be configured to access the memory device 1220. For example, the memory interface circuit 1215 may be configured to access the memory device 1220, based on the commands and addresses generated by the processor 1211 to control the memory device 1220. In an embodiment, the memory interface circuit 1215 may access the memory device 1220 through first signal lines SIGL1 and second signal lines SIGL2. In an embodiment, the memory interface circuit 1215 may communicate with the memory device 1220, based on the interface or protocol that is defined in compliance with the standard or is defined by a manufacturer. In an embodiment, the above interface or protocol may include a toggle interface or an open NAND flash interface (ONFI).

The memory device 1220 may operate under control of the storage controller 1210. The memory device 1220 may include a plurality of nonvolatile memories. In an embodiment, the plurality of nonvolatile memories included in the memory device 1220 may communicate with the storage controller 1210 through a plurality of channels and may form a plurality of ways. In an embodiment, the memory device 1220 may be implemented based on a NAND flash memory. However, the present disclosure is not limited thereto, the memory device 1220 may be implemented based on at least one of various nonvolatile memory devices such as a phase-change memory device, a ferroelectric memory device, a magnetic memory device, and a resistive memory device.

In an embodiment, the host 1100 may include a partition manager 1110. The partition manager 1110 may be configured to manage a storage space or a storage capacity of the storage device 1200. For example, as will be described later, the host 1100 may access the storage space of the storage device 1200 through a plurality of logical units of the storage device 1200. In this case, the partition manager 1110 may be configured to set or allocate a capacity for each of the plurality of logical units. In an embodiment, the partition manager 1110 may calculate the number of allocation units (dNumAllocUnits) allocated for each logical unit, based on a capacity and a memory type of each of the plurality of logical units. A configuration of the partition manager 1110 according to an embodiment and a configuration of calculating a capacity for each logical unit or the number of allocation units (dNumAllocaUnits) will be described in detail with reference to the following drawings.

Figure 2:
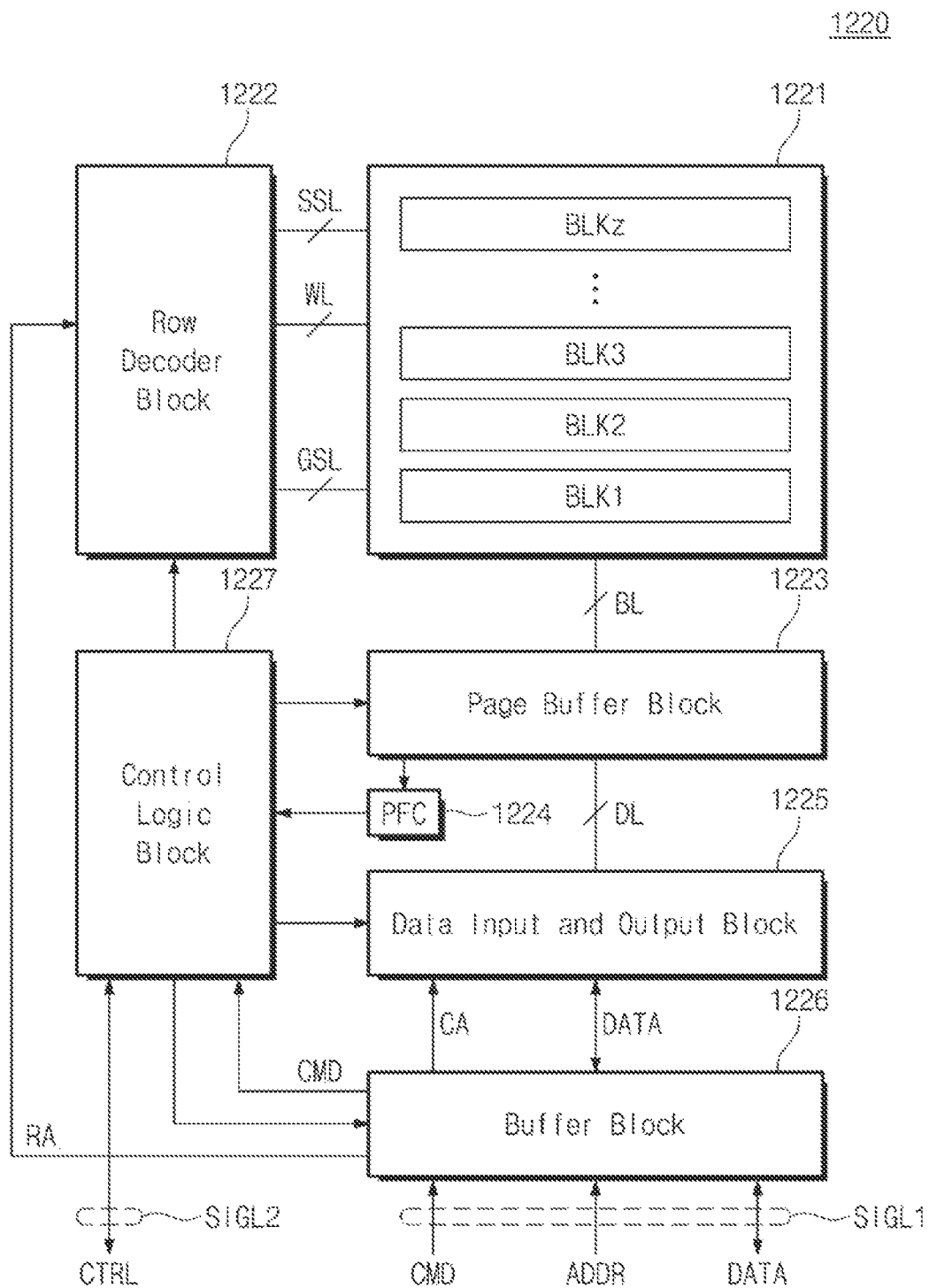
FIG. 2 is a block diagram illustrating a memory device of FIG. 1 according to an embodiment.

FIG. 2 is a block diagram illustrating a memory device of FIG. 1. In an embodiment, the memory device 1220 of FIG. 2 may correspond to one of the plurality of nonvolatile memories included in the memory device 1220 of FIG. 1. That is, the storage device 1200 may further include a plurality of memory devices similar in structure to the memory device 1220 of FIG. 2.

Referring to FIGS. 1 and 2, the memory device 1220 may include a memory cell array 1221, a row decoder block 1222, a page buffer block 1223, a pass/fail check block 1224, a data input and output block 1225, a buffer block 1226, and a control logic block 1227.

The memory cell array 1221 includes a plurality of memory blocks BLK1 to BLKz. Each of the plurality of memory blocks BLK1 to BLKz includes a plurality of memory cells. Each of the plurality of the memory blocks BLK1 to BLKz may be connected to the row decoder block 1222 through at least one ground selection line GSL, word lines WL, and at least one string selection line SSL. In an embodiment, some of the word lines WL may be used as a dummy word line. Each of the plurality of the memory blocks BLK1 to BLKz may be connected to the page buffer block 1223 through a plurality of bit lines BL. The plurality of memory blocks BLK1 to BLKz may be connected in common to the plurality of the bit lines BL.

In an embodiment, each of the plurality of memory blocks BLK1 to BLKz may be a unit of an erase operation. Memory cells included in the same memory block among the plurality of memory blocks BLK1 to BLKz may be erased at the same time. In an embodiment, each of the plurality of memory blocks BLK1 to BLKz may be divided into sub-blocks. Each of the plurality of sub-blocks may correspond to a unit of the erase operation. Memory cells included in the same sub-block among the plurality of sub-blocks may be erased at the same time.

Each of the plurality of memory blocks BLK1 to BLKz may include a plurality of pages. The plurality of pages may indicate a group of memory cells connected to each of the word lines WL. Each of the plurality of pages may be a unit of a write operation. The unit of the write operation is referred to as a "write unit".

In an embodiment, bits that are written in memory cells of one page may each constitute a logical page. When three bits are written in one memory cell, one physical page may include three logical pages. When one bit is written in one memory cell, one physical page may include one logical page. The logical page, the logical pages, or the physical page may be a unit of the read operation. The unit of the read operation is referred to as a "read unit".

The row decoder block 1222 is connected to the memory cell array 1221 through the ground selection lines GSL, the word lines WL, and the string selection lines SSL. The row decoder block 1222 operates under control of the control logic block 1227.

The row decoder block 1222 may decode a row address RA received from the buffer block 1226 and may control voltages to be applied to the string selection lines SSL, the word lines WL, and the ground selection lines GSL based on the decoded row address.

The page buffer block 1223 is connected to the memory cell array 1221 through the plurality of bit lines BL. The page buffer block 1223 is connected to the data input and output block 1225 through a plurality of data lines DL. The page buffer block 1223 operates under control of the control logic block 1227.

In a program operation, the page buffer block 1223 may store data to be written in memory cells. The page buffer block 1223 may apply voltages to the plurality of bit lines BL based on the stored data. In the read operation or in a verify read operation that is performed in the program operation or the erase operation, the page buffer block 1223 may sense voltages of the bit lines BL and may store a sensing result.

The pass/fail check block 1224 may verify the sensing result of the page buffer block 1223, in the verify read operation that is performed in the program operation or the erase operation. For example, in the verify read operation that is performed in the program operation, the pass/fail check block 1224 may count the number of values (e.g., "0") corresponding to on-cells that are not programmed to a target threshold voltage or higher. When the counting result is less than or equal to a threshold value, the pass/fail check block 1224 may output a fail signal to the control logic block 1227. When the counting result is greater than the threshold value, the pass/fail check block 1224 may output a pass signal to the control logic block 1227. Depending on a verification result of the pass/fail check block 1224, a program loop of the program operation may be further performed.

In the verify read operation that is performed in the erase operation, the pass/fail check block 1224 may count the number of values (e.g., "1") corresponding to off-cells that are not erased to a target threshold voltage or lower. When the counting result is greater than or equal to a threshold value, the pass/fail check block 1224 may output a fail signal to the control logic block 1227. When the counting result is smaller than the threshold value, the pass/fail check block 1224 may output a pass signal to the control logic block 1227. Depending on a verification result of the pass/fail check block 1224, an erase loop of the erase operation may be further performed.

The data input and output block 1225 is connected to the page buffer block 1223 through the plurality of data lines DL. The data input and output block 1225 may receive a column address CA from the buffer block 1226. The data input and output block 1225 may output the data read by the page buffer block 1223 to the buffer block 1226 depending on the column address CA. The data input and output block 1225 may provide the data received from the buffer block 1226 to the page buffer block 1223, based on the column address CA.

Through the first signal lines SIGL1, the buffer block 1226 may receive a command CMD and an address ADDR from an external device, and may exchange data "DATA" with the external device. The buffer block 1226 may operate under control of the control logic block 1227. The buffer block 1226 may provide the command CMD to the control logic block 1227. The buffer block 1226 may provide the row address RA of the address ADDR to the row decoder block 1222 and may provide the column address CA of the address ADDR to the data input and output block 1225. The buffer block 1226 may exchange the data "DATA" with the data input and output block 1225.

The control logic block 1227 may exchange a control signal CTRL with the external device through the second signal lines SIGL2. The control logic block 1227 may allow the buffer block 1226 to route the command CMD, the address ADDR, and the data "DATA". The control logic block 1227 may decode the command CMD received from the buffer block 1226 and may control the memory device 1220 based on the decoded command.

In an embodiment, the memory device 1220 may be manufactured in a bonding method. For example, the memory cell array 1221 may be manufactured by using a first wafer, and the row decoder block 1222, the page buffer block 1223, the pass/fail check block 1224, the data input and output block 1225, the buffer block 1226, and the control logic block 1227 may be manufactured by using a second wafer. The memory device 1220 may be implemented by coupling the first wafer and the second wafer such that an upper surface of the first wafer and an upper surface of the second wafer face each other.

In an embodiment, the memory device 1220 may be manufactured in a CoP (Cell-on-Peri or Cell-over-Peri) or CUA (CMOS under Array)) method. For example, a peripheral circuit including the row decoder block 1222, the page buffer block 1223, the pass/fail check block 1224, the data input and output block 1225, the buffer block 1226, and the control logic block 1227 may be implemented on a substrate. The memory cell array 1221 may be implemented on/over the peripheral circuit. The peripheral circuit and the memory cell array 1221 may be connected by using through vias.

Figure 3:
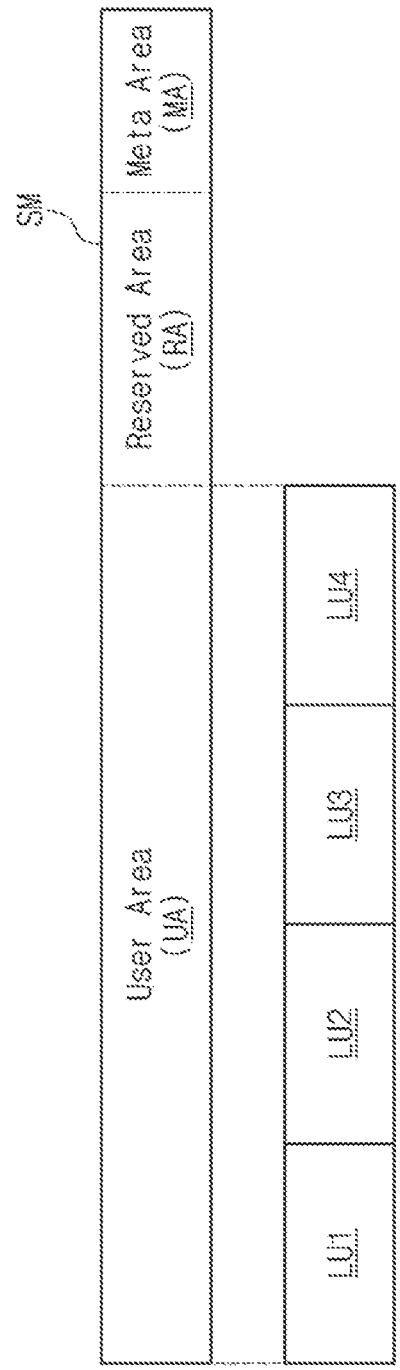
FIG. 3 is a diagram for describing an area of a storage device managed by a host of FIG. 1 according to an embodiment.

FIG. 3 is a diagram for describing an area of a storage device managed by a host of FIG. 1. Referring to FIGS. 1 and 3, the storage device 1200 may include a storage space SM. The storage space SM may refer to a physical storage space of the memory device 1220 included in the storage device 1200.

The storage space SM may include a user area UA, a reserved area RA, and a meta area MA. In an embodiment, each of the user area UA, the reserved area RA, and the meta area MA may include a plurality of erase units.

The storage controller 1210 of the storage device 1200 may provide the user area UA to the host 1100 as an accessible storage space. In an embodiment, the host 1100 may allocate logical addresses to the user area UA and may access the user area UA of the storage device 1200 based on the allocated logical addresses.

The storage controller 1210 of the storage device 1200 may not provide the reserved area RA to the host 1100. The storage controller 1210 of the storage device 1200 may use the reserved area RA to improve the performance of the storage device 1200. For example, the storage controller 1210 may use a plurality of erase units or a plurality of memory blocks included in the reserved area RA as a memory for replacing a bad block, a backup memory, or a buffering memory. The storage controller 1210 of the storage device 1200 may not provide the meta area MA to the host 1100. The storage controller 1210 of the storage device 1200 may store meta data necessary for the storage device 1200 to operate, for example, map data in the meta area MA.

As described above, the host 1100 may recognize the user area UA of the storage device 1200 as an accessible storage space, and may be configured to access memory blocks included in or allocated to the user area UA.

In an embodiment, the storage controller 1210 of the storage device 1200 may partition the user area UA into a plurality of logical units LU1 to LU4. Each of the plurality of logical units LU1 to LU4 may include one or more memory blocks or erase units.

In an embodiment, each of the plurality of logical units LU1 to LU4 may be an independent processing object that is externally addressable (i.e., from the outside) to process a command and perform task management functions. Each of the plurality of logical units LU1 to LU4 may include or contain a device server that is a conceptual object processing Small Computer System Interface (SCSI) command, a task manager that is a conceptual object controlling an arrangement order of commands and performing task management functions, and a task set that is a conceptual group (e.g., a list or a queue) of one or more commands.

FIG. 3 illustrates an example in which four logical units LU1 to LU4 are provided, but the present disclosure is not limited thereto. For example, the number of logical units managed by the storage controller 1210 of the storage device 1200 may be "8". In an embodiment, the number of logical units may be determined based on a "bMaxNumberLU" field of the geometry descriptor included in the storage controller 1210 of the storage device 1200, which indicates the maximum number of logical units. In an embodiment, the "bMaxNumberLU" field of the geometry descriptor may include information about the maximum number of logical units capable of being supported by the storage device 1200.

The host 1100 may access the user area UA of the storage device 1200 through the plurality of logical units LU1 to LU4. In an embodiment, a data storage capacity and a memory type of each of the plurality of logical units LU1 to LU4 may be determined or varied by settings of the storage device 1200 or settings of the host 1100 (or the user).

In an embodiment, the memory type of each of the plurality of logical units LU1 to LU4 may indicate the number of bits stored per memory cell. For example, memory cells included in the memory device 1220 of the storage device 1200 may be composed of quad level cells (QLC) each storing 4 bits. In this case, depending on the operation of the memory device 1220, each memory cell may operate as one of the QLC storing 4 bits, a triple level cell (TLC) storing 3 bits, a multi-level cell (MLC) storing 2 bits, and a single level cell (SLC) storing one bit.

As such, the first logical unit LU1 may be set to a memory type corresponding to the SLC; the second logical unit LU2 may be set to a memory type corresponding to the MLC; the third logical unit LU3 may be set to a memory type corresponding to the TLC; and the fourth logical unit LU4 may be set to a memory type corresponding to the QLC. The memory type of each of the plurality of logical units LU1 to LU4 may be determined or varied by the storage controller 1210 of the storage device 1200 or by the host 1100.

Figure 4:
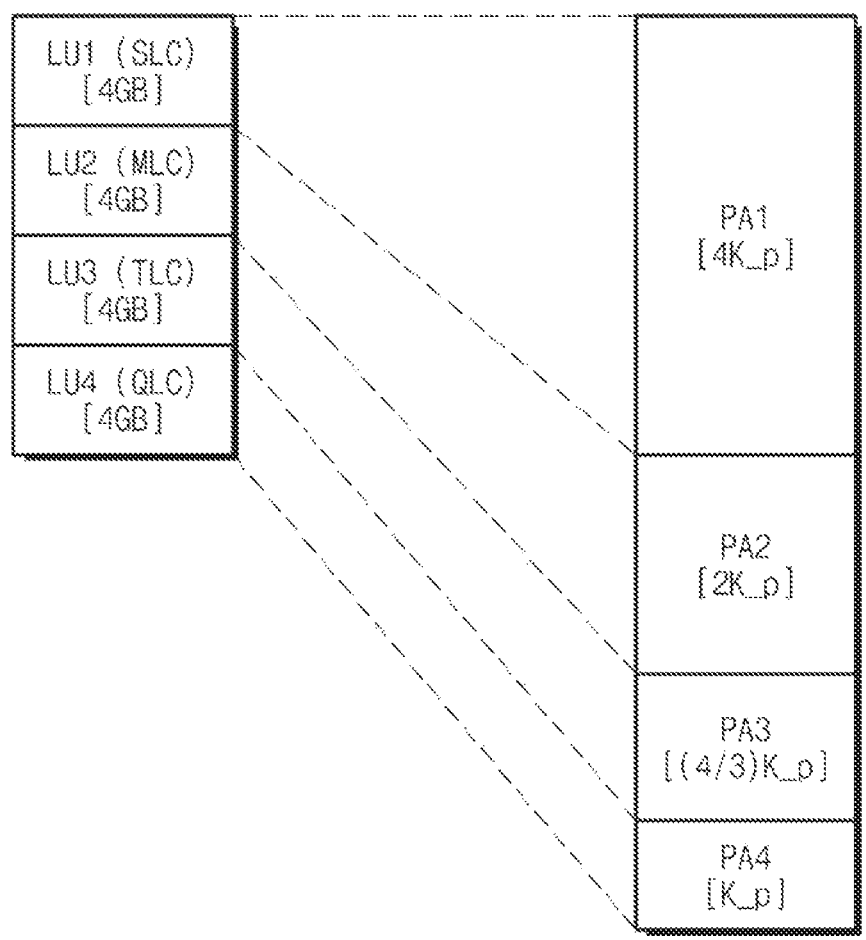
FIG. 4 is a diagram for describing partition setting for each of logical units of FIG. 3 according to an embodiment.

FIG. 4 is a diagram for describing partition setting for each of the plurality of logical units discussed above with respect to FIG. 3. Referring to FIGS. 1, 3, and 4, the host 1100 may access the storage space SM of the storage device 1200 through the plurality of logical units LU1 to LU4. For convenience of description, in FIG. 4, it is shown that the user area UA of the storage space SM of the storage device 1200 is partitioned into first to fourth physical areas PA1 to PA4. Each of the first to fourth physical areas PA1 to PA4 may indicate a group of a plurality of memory blocks of the memory device 1220.

Partition setting may be performed such that each of the first to fourth logical units LU1 to LU4 has a capacity of 4 GB. That is, each of the first to fourth logical units LU1 to LU4 may be configured to store user data of 4 GB. In this case, the first logical unit LU1 may be set to an SLC memory type, and the first physical area PA1 may be allocated to the first logical unit LU1. The second logical unit LU2 may be set to an MLC memory type, and the second physical area PA2 may be allocated to the second logical unit LU2. The third logical unit LU3 may be set to a TLC memory type, and the third physical area PA3 may be allocated to the third logical unit LU3. The fourth logical unit LU4 may be set to a QLC memory type, and the fourth physical area PA4 may be allocated to the fourth logical unit LU4.

In an embodiment, the fourth physical area PA4 allocated to the fourth logical unit LU4 corresponding to the QLC memory type may include $K\_p$ memory cells (or physical units or physical erase units). In this case, the third physical area PA3 allocated to the third logical unit LU3 corresponding to the TLC memory type may include $(4/3)*K\_p$ memory cells (or physical units or physical erase units); the second physical area PA2 allocated to the second logical unit LU2 corresponding to the MLC memory type may include $2*K\_p$ memory cells (or physical units or physical erase units); and, the first physical area PA1 allocated to the first logical unit LU1 corresponding to the SLC memory type may include $4*K\_p$ memory cells (or physical units or physical erase units).

As described above, even though the first to fourth logical units LU1 to LU4 have the same capacity, the numbers of actually allocated memory cells (or physical units or physical erase units) may be different from each other depending on memory types corresponding to the first to fourth logical units LU1 to LU4; for this reason, there is a need to compute information (e.g., dNumAllocUnits) about the number of allocation units in the partition setting for the first to fourth logical units LU1 to LU4.

Figures 5, 6:
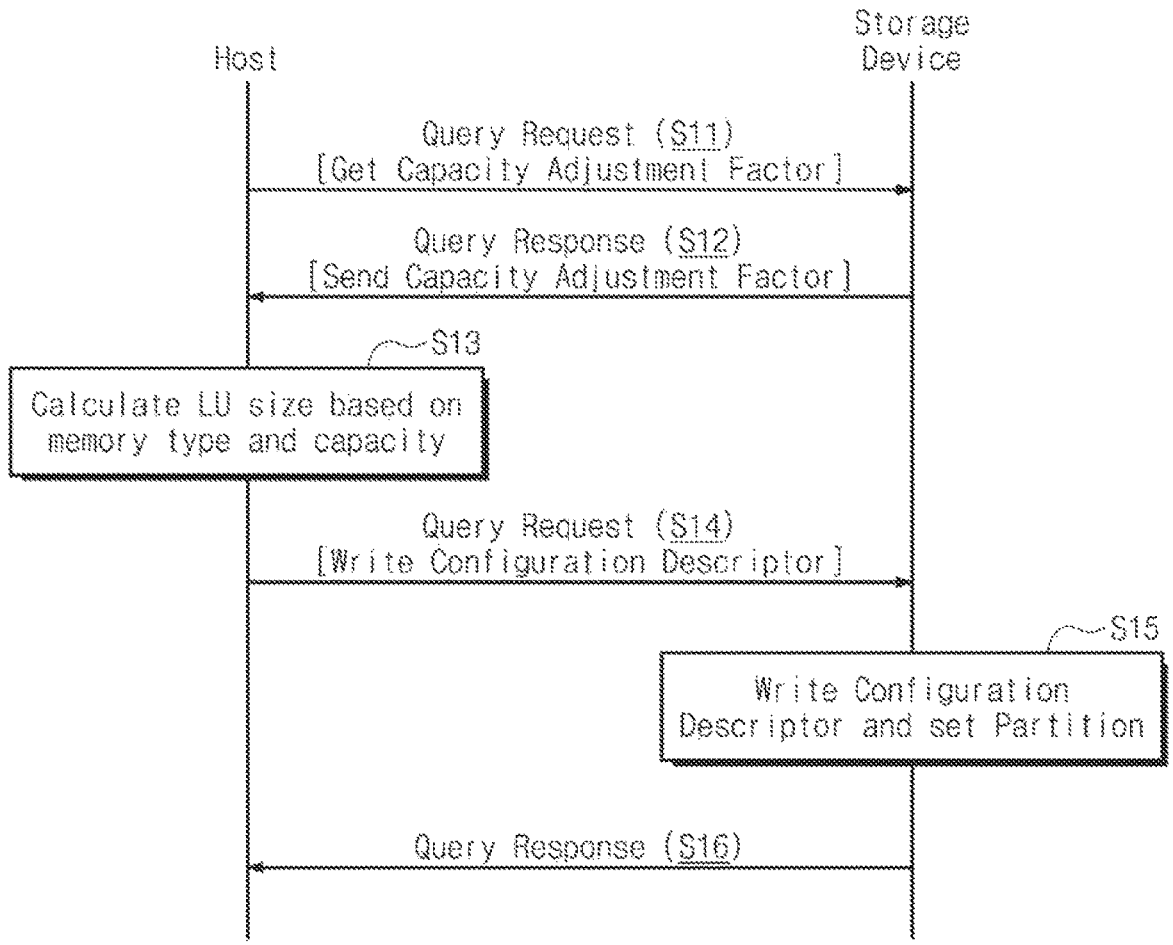
FIG. 5 is a flowchart for describing a partition setting operation of each of logical units of FIG. 4 according to an embodiment.
FIG. 6 is a diagram for describing a capacity adjustment factor used in operation S13 of FIG. 5 according to an embodiment.

FIG. 5 is a flowchart for describing a partition setting operation of each of the plurality of logical units discussed above with respect to FIG. 4. FIG. 6 is a diagrams for describing a capacity adjustment factor used in operation S13 of FIG. 5.

Referring to FIGS. 1, 4, 5, and 6, in operation S11, the host 1100 may transmit a query request to the storage device 1200. For example, the host 1100 may transmit the query request for obtaining capacity adjustment factor information to the storage device 1200. In an embodiment, the query request may have a format of the UFS Protocol Information Unit (UPIU). In an embodiment, the capacity adjustment factor may be differently set for each of a plurality of memory types and may be obtained through an enhanced memory type capacity adjustment factor field (e.g., wEnhanced1CapAdjFac) stored in the geometry descriptor of the storage device 1200.

In an embodiment, in the query request UPIU of operation S11, the opcode (OPCODE) field may be set to "01h", the descriptor identifier number (DESCRIPTOR IDN) field may be set to "07h", the index (INDEX) field may be set to "00h", and the selector (SELECTOR) field may be set to "00h". That is, the query request UPIU of operation S11 may be a standard read request for reading the geometry descriptor.

In operation S12, the storage device 1200 may transmit a query response to the host 1100 in response to the query request. For example, the storage device 1200 may transmit a query response UPIU including the capacity adjustment factor information to the host 1100. In an embodiment, the query response UPIU may include the geometry descriptor including the enhanced memory type capacity adjustment factor field (e.g., wEnhanced1CapAdjFac). In an embodiment, in the query response UPIU, the opcode (OPCODE) field may be set to "01h", the descriptor identifier number (DESCRIPTOR IDN) field may be set to "07h", the index (INDEX) field may be set to "00h", the selector (SELECTOR) field may be set to "00h", and the data segment may include the geometry descriptor.

In operation S13, the host 1100 may calculate the size of the logical unit, based on a memory type and a capacity. For example, the host 1100 may calculate the number of allocation units, based on a memory type and a capacity. In this case, the number of allocation units may be a value of the number (dNumAllocUnits) field, which is calculated according to Equation 1 below.

$$dNumAllocUnits = \text{CEILING}\left(\frac{LUCapacity \times CapacityAdjFactor}{bAllocationUnitSize \times dSegmentSize \times 512}\right)$$ [Equation 1]

In Equation 1 above, "dNumAllocUnits" indicates the number of allocation units associated with a corresponding logical unit, "LUCapacity" indicates a capacity of the corresponding logical unit, "CapacityAdjFactor" indicates a capacity adjustment factor associated with a memory type of the corresponding logical unit, "bAllocationUnitSize" indicates the size of an allocation unit, and "dSegmentSize" indicates the size of a segment. In an embodiment, the segment size may have a value expressed in units of 512 bytes. In an embodiment, the size of the allocation unit may have a value expressed in the number of segments.

In an embodiment, "LUCapacity" may correspond to a capacity or a partition size to be set to a corresponding logical unit by the host 1100, "CapacityAdjFactor", "bAllocationUnitSize", and "dSegmentSize" may be obtained through the geometry descriptor.

In an embodiment, when each memory cell of the storage device 1200 operates as a QLC storing 4 bits, as illustrated in FIG. 6, the QLC memory type may correspond to a normal memory type, the TLC memory type may correspond to a first enhanced memory type (Enhanced Memory Type 1), the MLC memory type may correspond to a second enhanced memory type (Enhanced Memory Type 2), and the SLC memory type may correspond to a third enhanced memory type (Enhanced Memory Type 3).

The capacity adjustment factor may be expressed by a ratio of a capacity of the normal memory type and a capacity of a corresponding memory type, that is, $Capacity_{NormalMem}/Capacity_{Enhanced}$, as illustrated in FIG. 6. That is, the capacity adjustment factor of the normal memory type may be "1", the capacity adjustment factor of the first enhanced memory type may be "4/3 (=1.333 . . . )", and the second enhanced memory type may be "4/2 (=2)", and the capacity adjustment factor of the third enhanced memory type may be "4/1 (=4)".

In an embodiment, the capacity adjustment factor for each of a plurality of memory types may be checked through the "wEnhanced1CapAdjFac" field, the "wEnhanced2CapAdjFac" field, the "wEnhanced3CapAdjFac" field, or the "wEnhanced4CapAdjFac" field of the geometry descriptor.

In an embodiment, with regard to the fourth logical unit LU4, as an example, a partition of 4 GB is set, a memory type is a QLC, "bAllocationUnitSize" is 8, and "dSegmentSize" is 1024. Because the QLC type corresponds to the normal memory type, the capacity adjustment factor may be "1". In this case, "dNumAllocUnits" of the fourth logical unit LU4 may be calculated according to Equation 2 below with reference to Equation 1 above.

$$dNumAllocUnitsLU1 = \text{CEILING}\left(\frac{4 \text{ Gbyte} \times 1}{8 \times 1024 \times 512 \text{ byte}}\right) = \text{CEILING}\left(\frac{4 \text{ Gbyte}}{4 \text{ Mbyte}}\right) = 1024$$ [Equation 2]

According to a condition of the first logical unit LU1, the number of allocation units (dNumAllocUnits) may be calculated as "1024" according to Equation 2 above.

In operation S14, the host 1100 may transmit the query request to the storage device 1200. For example, the host 1100 may transmit the query request UPIU for writing the number of allocation units (dNumAllocUnits) thus calculated in the configuration descriptor to the storage device 1200. In an embodiment, in the query request UPIU of operation S14, the opcode (OPCODE) field may be set to "02h", the descriptor identifier number (DESCRIPTOR IDN) field may be set to "01h", the index (INDEX) field may be set to "00h" to "03h" depending on a corresponding logical unit, the selector (SELECTOR) field may be set to "00h", and the data segment may include data to be written (i.e., the number of allocation units (dNumAllocUnits)).

In operation S15, in response to the query request, the storage device 1200 may write the configuration descriptor and may set a partition. For example, the storage device 1200 may write the calculated number of allocation units (dNumAllocUnits) included in the query request UPIU in a corresponding field of the configuration descriptor.

In operation S16, the storage device 1200 may transmit the query response to the host 1100. For example, the storage device 1200 may transmit the query response UPIU providing notification that the calculated number of allocation units (dNumAllocUnits) is written in the configuration descriptor to the host 1100.

In an embodiment, in the storage device 1200, a logical block count may be set to a unit descriptor, based on the calculated number of allocation units.

As described above, the host 1100 may calculate information about the number of allocation units based on a memory type and a capacity for each logical unit. In this case, the host 1100 obtains information about the capacity adjustment factor for each memory type from the storage device 1200. In this case, because some capacity adjustment factors may be expressed in the form of a decimal fraction, the number of allocation units may not be calculated normally.

For example, it is assumed that the first logical unit LU1 corresponds to the QLC memory type (i.e., the normal memory type), the second logical unit LU2 corresponds to the TLC memory type (i.e., the first enhanced memory type), and a capacity of 4 GB is allocated for each of the first and second logical units LU1 and LU2. According to the above assumption, the number of allocation units (i.e., dNumAllocUnits LU1) associated with the first logical unit LU1 may be calculated according to Equation 2 above as "1024". Because the capacity adjustment factor of the first enhanced memory type (Enhanced Memory Type 1) is "4/3", in a normal case, the number of allocation units (i.e., dNumAllocUnits LU2) associated with the second logical unit LU2 may be calculated as "CEILING(1024*4/3)=1366".

However, because the capacity adjustment factor of the first enhanced memory type (Enhanced Memory Type 1) is "4/3", it is expressed in the form of a decimal fraction (e.g., 1.33333333 . . . ). The partition manager 1110 of the host 1100 or any other calculation level may not provide the floating point operation. Alternatively, the floating point operation may not be supported between the host 1100 and the storage device 1200. In this case, the capacity adjustment factor of the first enhanced memory type (Enhanced Memory Type 1) may be abnormally recognized in the form of an integer such as "1" or "2". The number of allocation units (i.e., dNumAllocUnits LU2) associated with the second logical unit LU2 may be calculated as "CEILING(1024*1)=1024" or "CEILING(1024*2)=2048".

That is, in a normal case, the number of allocation units associated with the second logical unit LU2 of the TLC type should be calculated to be 4/3 times the number of allocation units associated with the first logical unit LU1 of the QLC type. However, calculation (or partition setting) may not be normally made due to an error of the calculation of the host 1100.

Figure 7:
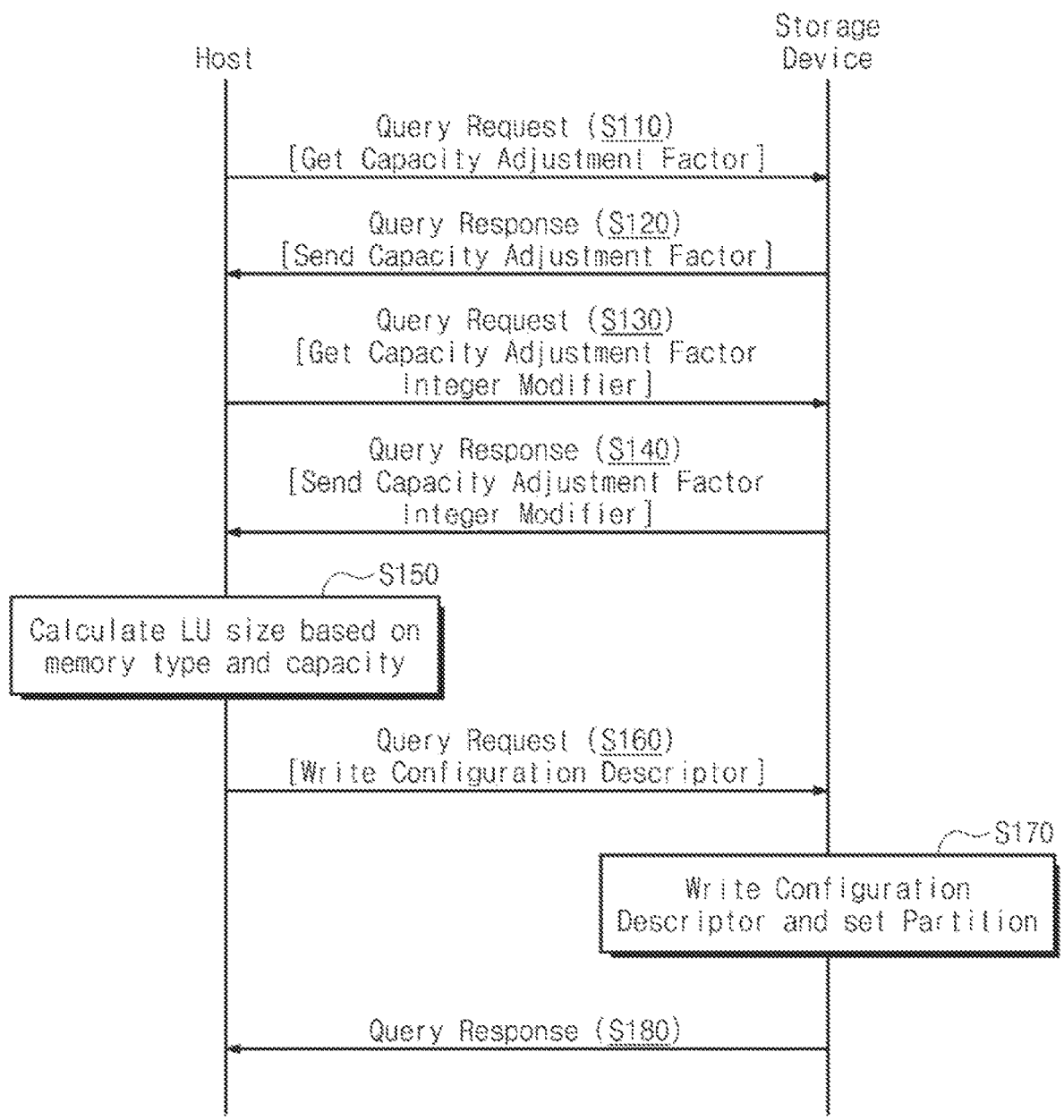
FIG. 7 is a flowchart illustrating an operation of a storage system of FIG. 1 according to an embodiment.

FIG. 7 is a flowchart illustrating an operation of a storage system of FIG. 1. FIG. 8 is a diagram for describing specific fields used in an operation according to the flowchart of FIG. 7. FIG. 9 is a diagram for describing a capacity adjustment factor set according to the flowchart of FIG. 8. Below, to describe embodiments, a capacity adjustment factor is newly defined, and a capacity adjustment factor integer modifier is newly defined. Below, each factor will be described in detail.

Referring to FIGS. 1, 7, 8, and 9, in operation S110, the host 1100 may transmit the query request to the storage device 1200. For example, the host 1100 may transmit the query request UPIU for obtaining the capacity adjustment factor to the storage device 1200. In an embodiment, the capacity adjustment factor may be obtained from the fields (e.g., wEnhanced1CapAdjFac, wEnhanced2CapAdjFac, wEnhanced3CapAdjFac, and wEnhanced4CapAdjFac) included in the geometry descriptor of the storage device 1200.

In an embodiment, in the query request UPIU of operation S110, the opcode (OPCODE) field may be set to "01h", the descriptor identifier number (DESCRIPTOR IDN) field may be set to "07h", the index (INDEX) field may be set to "00h", and the selector (SELECTOR) field may be set to "00h". That is, the query request UPIU of operation S110 may be the standard read request for reading the geometry descriptor.

In operation S120, the storage device 1200 may transmit the query response to the host 1100. For example, the storage device 1200 may transmit the query response UPIU including the capacity adjustment factor information to the host 1100. In an embodiment, in the query response UPIU, the opcode (OPCODE) field may be set to "01h", the descriptor identifier number (DESCRIPTOR IDN) field may be set to "07h", the index (INDEX) field may be set to "00h", the selector (SELECTOR) field may be set to "00h", and the data segment may include the geometry descriptor.

In operation S130, the host 1100 may transmit the query request to the storage device 1200. For example, the host 1100 may transmit the query request UPIU for obtaining the capacity adjustment factor integer modifier to the storage device 1200. In an embodiment, the capacity adjustment factor integer modifier may be included in the geometry descriptor of the storage device 1200. In an embodiment, some fields (e.g., OPCODE, DESCRIPTOR IDN, INDEX, and SELETOR) of the query request UPIU of operation S130 may be the same as those of the query request UPIU of operation 110.

In operation S140, the storage device 1200 may transmit the query response to the host 1100. For example, the storage device 1200 may transmit the query response UPIU including the capacity adjustment factor integer modifier to the host 1100. In an embodiment, some fields (e.g., OPCODE, DESCRIPTOR IDN, INDEX, and SELETOR) of the query response UPIU of operation S140 may be the same as those of the query response UPIU of operation 120, and the data segment may include the capacity adjustment factor integer modifier.

In an embodiment, the capacity adjustment factor according to the memory type may be calculated based on the geometry descriptor of the storage device 1200 received through operation S110 to operation S140. For example, as illustrated in FIG. 8, the geometry descriptor may include the "wEnhanced1CapAdjFac" field and the "wCapAdjFacIntModifier" field.

The "wEnhanced1CapAdjFac" field may have an offset of "30h" in the geometry descriptor. The "wEnhanced1CapAdjFac" field is the capacity adjustment factor for the first enhanced memory type. The "wEnhanced1CapAdjFac" field may be the ratio between the capacity obtained with the normal memory type and the capacity obtained with the first enhanced memory type for the same amount of allocation units. In this case, the "wEnhanced1CapAdjFac" field may be calculated according to Equation 3 below.

$$wEnhanced1CapAdjFac = \text{INTEGER}(256 \times CapacityAdjFactor) \quad \text{[Equation 3]}$$

$$CapacityAdjFactor = \frac{Capacity_{NormalMem}}{Capacity_{Enhanced1}} \times wCapAdjFacIntModifier$$

In Equation 3 above, $Capacity_{NormalMem}$ indicates the first capacity obtained with memory cells of the normal memory type for the first number of allocation units, $Capacity_{Enhanced1}$ indicates the second capacity obtained with the first enhanced memory type (Enhanced Memory Type 1) for the first number of allocation units. For example, when the normal memory type is the QLC and the first enhanced memory type is the TLC, Capacity$_{NormalMem}$/Capacity$_{Enhanced1}$ may be "4/3".

The "wCapAdjFacIntModifier" field is described with reference to FIG. 8. For example, the "wCapAdjFacIntModifier" field may have an offset of "4Dh" in the geometry descriptor. The "wCapAdjFacIntModifier" field is the factor that allows "CapacityAdjFactor" to be calculated in an integer type. For example, the "wCapAdjFacIntModifier" field may be set to the least common multiple of denominators of capacity adjustment factors that are not an integer. In an embodiment, when the normal memory type is the QLC, the "wCapAdjFacIntModifier" field may be set to "3"; when the normal memory type is the PLC, the "wCapAdjFacIntModifier" field may be set to "12"; when the normal memory type is the OLC, the "wCapAdjFacIntModifier" field may be set to "60".

As described above, when the normal memory type is the QLC and the first enhanced memory type (Enhanced Memory Type 1) is the TLC, through Equation 3 above, the capacity adjustment factor for the first enhanced memory type (Enhanced Memory Type 1) may be set to "4/3*3 (=4)". In this case, the "wEnhanced1CapAdjFac" field received through the query response UPIU may have a value of "INTEGER(256*4/3*3) (=1024)".

In an embodiment, as illustrated in FIG. 9, the capacity adjustment factor for each of the plurality of memory types may be determined with reference to Equation 3 above. For example, the normal memory type may correspond to the QLC, the first enhanced memory type (Enhanced Memory Type 1) may correspond to the TLC, the second enhanced memory type (Enhanced Memory Type 2) may correspond to the MLC, and the third enhanced memory type (Enhanced Memory Type 3) may correspond to the SLC. In this case, because the normal memory type corresponds to the QLC, the "wCapAdjFacIntModifier" field is set to "3". In this case, the capacity adjustment factor corresponding to the normal memory type may be "4/4*3 (=3)", the capacity adjustment factor corresponding to the first enhanced memory type (Enhanced Memory Type 1) may be "4/3*3 (=4)", the capacity adjustment factor corresponding to the second enhanced memory type (Enhanced Memory Type 2) may be "4/2*3 (=6)", and the capacity adjustment factor corresponding to the third enhanced memory type (Enhanced Memory Type 3) may be "4/1*3 (=12)".

FIG. 7 illustrates an example in which the host 1100 and the storage device 1200 exchange the query request UPIU and the query response UPIU two times, but the present disclosure is not limited thereto. For example, through operation S110 to operation S140, the host 1100 obtains the capacity adjustment factor and the capacity adjustment factor integer modifier. In this case, the field (e.g., the "wEnhanced1CapAdjFactor" field) corresponding to the capacity adjustment factor and the field (e.g., the "wCapAdjFacIntModifier" field) corresponding to the capacity adjustment factor integer modifier may be included in the geometry descriptor of the storage device 1200. That is, the host 1100 may transmit the query request UPIU for reading the geometry descriptor to the storage device 1200, and the storage device 1200 may transmit the query response UPIU including the geometry descriptor to the host 1100.

In operation S150, the host 1100 may calculate the size of the logical unit based on a memory type and a capacity. For example, the host 1100 may calculate the number of allocation units, based on a memory type and a capacity. In this case, the number of allocation units may be a value of "dNumAllocUnits", which is calculated according to Equation 4 below.

$$dNumAllocUnits = \text{CEILING}\left(\frac{LUCapacity \times CapacityAdjFactor}{bAllocationUnitSize \times dSegmentSize \times 512 \times wCapAdjFacIntModifier}\right) \quad \text{[Equation 4]}$$

Variables of Equation 4 above are described with reference to FIG. 3, and thus, additional description will be omitted to avoid redundancy. When the number of allocation units for each logical unit is calculated based on Equation 3 and Equation 4, the number of allocation units may be normally calculated. For example, it is assumed that the first logical unit LU1 corresponds to the QLC memory type (i.e., the normal memory type), the second logical unit LU2 corresponds to the TLC memory type (i.e., the first enhanced memory type (Enhanced Memory Type 1)), and a capacity of 4 GB is assigned to for each of the first and second logical units LU1 and LU2. Also, it is assumed that "bAllocationUnitSize" is 8 and "dSegmentSize" is 1024. In this case, the capacity adjustment factor corresponding to the normal memory type of the QLC may be "3", and the capacity adjustment factor corresponding to the first enhanced memory type of the TLC may be "4".

The number of allocation units (dNumAllocUnits LU1) for the first logical unit LU1 and the number of allocation units (dNumAllocUnits LU2) for the second logical unit LU2 may be calculated according to Equation 5 below.

$$dNumAllocUnitsLU1 = \text{CEILING}\left(\frac{4 \text{ Gbyte} \times 3}{8 \times 1024 \times 512 \text{ byte} \times 3}\right) = \text{CEILING}\left(\frac{4 \text{ Gbyte}}{4 \text{ Mbyte}}\right) = 1024 \quad \text{[Equation 5]}$$

$$dNumAllocUnitsLU2 = \text{CEILING}\left(\frac{4 \text{ Gbyte} \times 4}{8 \times 1024 \times 512 \text{ byte} \times 3}\right) = \text{CEILING}\left(\frac{16 \text{ Gbyte}}{12 \text{ Mbyte}}\right) = 1366$$

According to Equation 5 above, the ratio between the number of allocation units (dNumAllocUnits LU1) calculated with respect to the first logical unit LU1 and the number of allocation units (dNumAllocUnits LU2) calculated with respect to the second logical unit LU2 may be about "4/3". Because all the factors used for the above calculation in the host 1100 are integers, as described with reference to FIGS. 5 and 6, an error due to the decimal fraction calculation may be prevented. Accordingly, it is possible to normally set a capacity or a partition for each of the plurality of memory types.

The host 1100 and the storage device 1200 may perform operation S160 to operation S180. In an embodiment, operation S160 to operation S180 are similar to S14 to operation S16 of FIG. 5, and thus, additional description will be omitted to avoid redundancy. In an embodiment, the query request UPIU of operation S160 may be a request for recording the calculated number of allocation units (nNumAllocUnits) at the configuration descriptor of the storage device 1200.

As described above, according to an embodiment, the geometry descriptor of the storage device 1200 may include the "wCapAdjFacIntModifier" field. The capacity adjustment factor integer modifier (wCapAdjFacIntModifier) field has a value for modifying the capacity adjustment factor corresponding to each memory type in the form of an integer. In this case, the host 1100 may obtain the capacity adjustment factor through the "wEnhanced1CapAdjFac" field included in the geometry descriptor of the storage device 1200, and the capacity adjustment factor may be in the form of an integer. The host 1100 may use the capacity adjustment factor integer modifier (wCapAdjFacIntModifier) for the purpose of compensating for the capacity adjustment factor modified in the form of an integer in the process of calculating the number of allocation units (dNumAllocUnits) for each logical unit.

Accordingly, even though the floating point operation is not supported in the host 1100, it is possible to normally set a partition with respect to a specific memory type. This may mean that the reliability of the storage system 1000 is improved.

FIG. 10 is a diagram for describing a portion of a geometry descriptor set to a storage device of FIG. 1. Referring to FIGS. 1 and 10, the geometry descriptor of the storage device 1200 may further include the "wEnhanced2CapAdjFac" field, the "wEnhanced3CapAdjFac" field, and the "wEnhanced4CapAdjFac" field.

The "wEnhanced2CapAdjFac" field may have an offset of "36h" in the geometry descriptor. The "wEnhanced2CapAdjFac" field may be the capacity adjustment factor for the second enhanced memory type. The "wEnhanced2CapAdjFac" field may be the ratio between the capacity obtained with the normal memory type and the capacity obtained with the second enhanced memory type for the same amount of allocation units. In this case, the "wEnhanced2CapAdjFac" field may be calculated according to Equation 6 below.

$$wEnhanced1CapAdjFac = \text{INTEGER}(256 \times CapacityAdjFactor) \quad \text{[Equation 6]}$$

$$CapacityAdjFactor = \frac{Capacity_{NormalMem}}{Capacity_{Enhanced2}} \times wCapAdjFacIntModifier$$

In Equation 6 above, $Capacity_{Enhanced2}$ indicates the capacity obtained with the second enhanced memory type. The remaining factors are similar to those described with reference to Equation 3 above except that $Capacity_{Enhanced2}$ is used instead of $Capacity_{Enhanced1}$, and thus, additional description will be omitted to avoid redundancy.

The "wEnhanced3CapAdjFac" field may have an offset of "3Ch" in the geometry descriptor. The "wEnhanced3CapAdjFac" field may be the capacity adjustment factor for the third enhanced memory type. The "wEnhanced3CapAdjFac" field is similar to the "wEnhanced2CapAdjFac" field described above except for the information about the third enhanced memory type, and thus, additional description will be omitted to avoid redundancy.

The "wEnhanced4CapAdjFac" field may have an offset of "42h" in the geometry descriptor. The "wEnhanced4CapAdjFac" field may be the capacity adjustment factor for the fourth enhanced memory type. The "wEnhanced4CapAdjFac" field is similar to the "wEnhanced2CapAdjFac" field described above except for the information about the fourth enhanced memory type, and thus, additional description will be omitted to avoid redundancy.

As illustrated in FIG. 10, the capacity adjustment factor (CapacityAdjFactor) of each of the "wEnhanced2CapAdjFac" field, the "wEnhanced3CapAdjFac" field, and the "wEnhanced4CapAdjFac" field may be expressed by using "wCapAdjFacIntModifier". That is, the capacity adjustment factor for each of various memory types may be expressed in the form of an integer FIG. 11 is a diagram for describing a capacity adjustment factor set in a storage device of FIG. 1. Referring to FIGS. 1 and 11, each of the memory cells of the memory device 1220 of the storage device 1200 may be a penta level cell (PLC) configured to store 5 bits. In this case, the normal memory type of the storage device 1200 may correspond to the PLC.

As in the above description, the storage device 1200 may support various memory types. For example, the first enhanced memory type (Enhanced Memory Type 1) may correspond to the QLC, the second enhanced memory type (Enhanced Memory Type 2) may correspond to the TLC, the third enhanced memory type (Enhanced Memory Type 3) may correspond to the MLC, and the fourth enhanced memory type (Enhanced Memory Type 4) may correspond to the SLC.

When the capacity adjustment factor (CapacityAdjFactor) is set as described with reference to FIG. 5 (i.e., $Capacity_{NormalMem}/Capacity_{Enhanced}$), the capacity adjustment factor for each memory type may be set as illustrated in FIG. 11. For example, the capacity adjustment factor of the normal memory type corresponding to the PLC may be set to "5/5 (=1)"; the capacity adjustment factor of the first enhanced memory type corresponding to the QLC may be set to "5/4 (=1.25)"; the capacity adjustment factor of the second enhanced memory type corresponding to the TLC may be set to "5/3 (=1.666 . . . )"; the capacity adjustment factor of the third enhanced memory type corresponding to the MLC may be set to "5/2 (=2.5)"; and, the capacity adjustment factor of the fourth enhanced memory type corresponding to the SLC may be set to "5/1 (=5)". According to the above description, the capacity adjustment factor corresponding to each of the first, second, and third enhanced memory types may be expressed in the form of a decimal fraction; in this case, an error may occur in the process in which the host 1100 calculates the number of allocation units.

Accordingly, according to an embodiment, the capacity adjustment factor (CapacityAdjFactor) may be modified to an integer through the capacity adjustment factor integer modifier (wCapAdjFacIntModifier). In an embodiment, when the normal memory type of the storage device 1200 corresponds to the PLC, the capacity adjustment factor integer modifier (wCapAdjFacIntModifier) may be set to "12". For example, the number of bits per cell corresponding to the normal memory type is "5". In this case, the capacity adjustment factor integer modifier (wCapAdjFacIntModifier) may be determined as the least common multiple of k values (k being a natural number less than 5) satisfying a condition that 5/k is a decimal fraction. As shown in FIG. 11, the k values satisfying the above condition are "4", "3", and "2". Accordingly, the capacity adjustment factor integer modifier (wCapAdjFacIntModifier) may be set to "12," which is the least common multiple of "4", "3", and "2".

In this case, the capacity adjustment factor of the normal memory type corresponding to the PLC may be set to "5/5*12 (=12)"; the capacity adjustment factor of the first enhanced memory type corresponding to the QLC may be set to "5/4*12 (=15)"; the capacity adjustment factor of the second enhanced memory type corresponding to the TLC may be set to "5/3*12 (=20)"; the capacity adjustment factor of the third enhanced memory type corresponding to the MLC may be set to "5/2*12 (=30)"; and, the capacity adjustment factor of the fourth enhanced memory type corresponding to the SLC may be set to "5/1*12 (=60)". According to the above description, the capacity adjustment factor for each memory type may be expressed in the form of an integer. Accordingly, as described with reference to FIGS. 7 and 8, even though the floating point operation is not supported in the host 1100, the number of allocation units for each logical unit may be normally calculated.

In an embodiment, examples in which the normal memory type of the storage device 1200 is the QLC and the normal memory type of the storage device 1200 is the PLC are described, but the present disclosure is not limited thereto. For example, the normal memory type of the storage device 1200 may correspond to an operation implemented to store M bits per cell. In this case, the capacity adjustment factor integer modifier (wCapAdjFacIntModifier) may be determined as the least common multiple of k values (k being a natural number less than M) satisfying a condition that M/k is a decimal fraction. Alternatively, the capacity adjustment factor integer modifier (wCapAdjFacIntModifier) may be determined as the least common multiple of natural numbers that are not divisors of "M" from among natural numbers less than "M".

As an example, when M=3 (i.e., in the case of the triple level cell), "k" may be "2"; in this case, the capacity adjustment factor integer modifier (wCapAdjFacIntModifier) may be set to "2". When M=6 (i.e., in the case of the hexa level cell), "k" may be "5" and "4"; in this case, the capacity adjustment factor integer modifier (wCapAdjFacIntModifier) may be set to "20". When M=7 (i.e., in the case of the hepta level cell), "k" may be "6", "5", "4", "3", and "2"; in this case, the capacity adjustment factor integer modifier (wCapAdjFacIntModifier) may be set to "60". When M=8 (i.e., in the case of the octa level cell), "k" may be "7", "6", "5", and "3"; in this case, the capacity adjustment factor integer modifier (wCapAdjFacIntModifier) may be set to "210". The above description is provided only as an example, and the present disclosure is not limited thereto.

In the above embodiments, the description is given as the memory type of each logical unit is the SLC, MLC, TLC, QLC, or PLC. However, the present disclosure is not limited thereto. For example, the memory type of the logical unit may include a system code type and a non-persistent type in addition to the first to fourth enhanced memory types described above. When the logical unit is set to the system code type, the logical unit may update system files, binary codes capable of executing files, a host operating system image, or any other system data structures on rare occasion. When the logical unit is set to the non-persistent type, the logical unit may be used for temporary information.

In an embodiment, when the logical unit is set to the above system code type or non-persistent type, the host 1100 may set a partition of the logical unit by using the capacity adjustment factor, based on the method described above. In this case, as in the above description, the capacity adjustment factor corresponding to the system code type or the non-persistent type may be expressed by a product of the ratio (Capacity$_{NormalMem}$/Capacity$_{SystemCode}$ or Capacity$_{NormalMem}$/Capacity$_{NonPersist}$) between the capacity of the normal memory type and the capacity of the corresponding memory type and the capacity adjustment factor integer modifier (wCapAdjFacIntModifier); as in the above description, the host 1100 may perform partition setting on the logical unit for each memory type by using the capacity adjustment factor (CapacityAdjFactor) and the capacity adjustment factor integer modifier (wCapAdjFacIntModifier).

In an embodiment, information about the capacity adjustment factor of the system code type may be set to the system code capacity adjustment factor (wSystemCodeCapAdjFac) field of the geometry descriptor of the storage device 1200, and the system code capacity adjustment factor (wSystemCodeCapAdjFac) field may have an offset of "24h" in the geometry descriptor. Information about the capacity adjustment factor of the non-persistent type may be set to the non-persistent capacity adjustment factor (wNonPersistCapAdjFac) field of the geometry descriptor of the storage device 1200, and the non-persistent capacity adjustment factor (wNonPersistCapAdjFac) field may have an offset of "2Ah" in the geometry descriptor.

Figure 12:
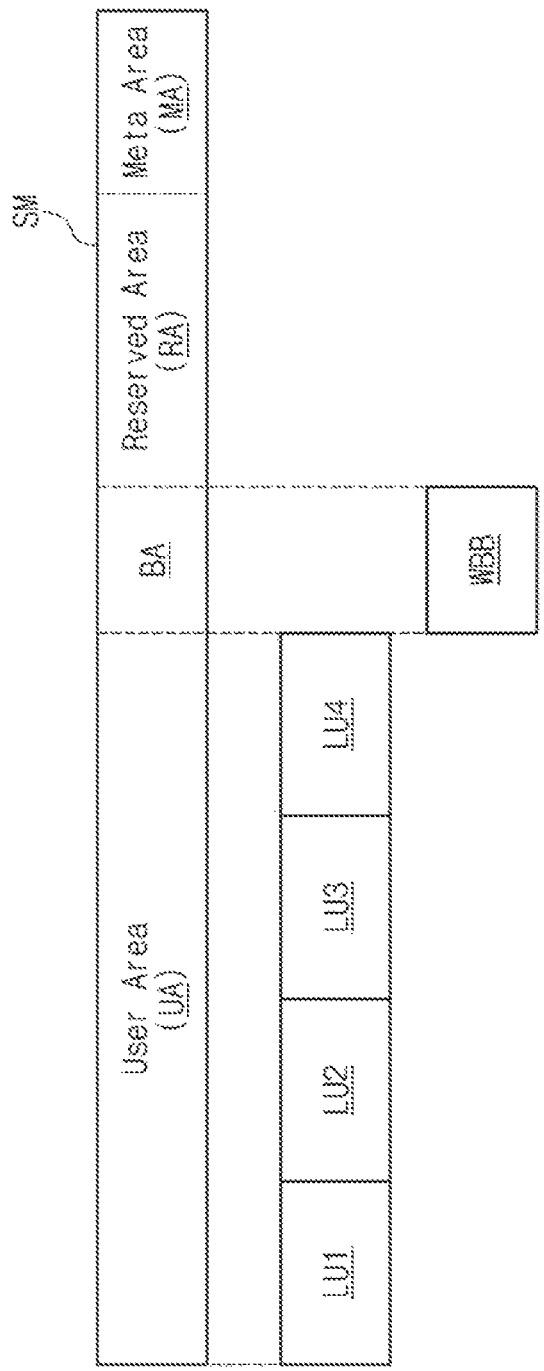
FIG. 12 is a diagram for describing an area of a storage device managed by a host of FIG. 1 according to an embodiment.

FIG. 12 is a diagram for describing an area of a storage device managed by a host of FIG. 1. Referring to FIGS. 1 and 12, the storage device 1200 may include the storage space SM. The storage space SM may refer to a physical storage space of the memory device 1220 included in the storage device 1200.

The storage space SM may include the user area UA, the reserved area RA, the meta area MA, and a buffer area BA. The storage device 1200 may partition the user area UA into the plurality of logical units logical units LU1 to LU4. The user area UA, the reserved area RA, the meta area MA, and the plurality of logical units LU1 to LU4 are described above, and thus, additional description will be omitted to avoid redundancy.

In an embodiment, the storage space SM may further include the buffer area BA. The buffer area BA may be used for performance improvement of the storage device 1200. For example, the buffer area BA may be configured to support a write booster operation of the storage device 1200. The write booster operation indicates an operation of writing the user data received from the host 1100 in a fast memory type. The performance of the storage device 1200 may be improved through the write booster operation.

In an embodiment, for the write booster operation, the buffer area BA may be allocated, and the buffer area BA may be managed as a write booster buffer WBB. In an embodiment, the write booster buffer WBB may correspond to a memory type having a faster operating speed than the normal memory type (e.g., QLC or TLC). As an example, the write booster buffer WBB may correspond to the SLC, but the present disclosure is not limited thereto.

In an embodiment, the size of the write booster buffer WBB may be set or adjusted through various methods. In this case, the size or capacity of the write booster buffer WBB may be set based on a method similar to the method described with reference to FIGS. 8 to 11. That is, the capacity adjustment factor corresponding to the memory type of the write booster buffer WBB may be determined, and the host 1100 may calculate the number of allocation units to be allocated to the write booster buffer WBB based on the capacity adjustment factor and the capacity of the write booster buffer WBB.

In an embodiment, the write booster buffer WBB may be an LU dedicated buffer dedicated for one of the plurality of logical units LU1 to LU4. Alternatively, the write booster buffer WBB may be a shared buffer that at least two of the plurality of logical units LU1 to LU4 share.

In an embodiment, the write booster buffer WBB may be set to a user space reduction mode and may be implemented by using a portion of the user area UA. In this case, the user area UA may be decreased due to the allocation of the write booster buffer WBB. Alternatively, the write booster buffer WBB may be set to a preserve user space mode and may be implemented regardless of the user area UA. In this case, the storage capacity of the user area UA may be uniformly sustained.

FIG. 13 is a diagram for describing a specific field used with respect to a write booster buffer of FIG. 12. Referring to FIGS. 12 and 13, the size of the write booster buffer WBB may be set in various methods (e.g., an LU dedicated buffer or a shared buffer) as described above. In this case, as described above, when the write booster buffer WBB is set to the user space reduction mode, the size of the user area UA may be decreased as much as the capacity or size of the write booster buffer WBB. The reduced size of the user area UA may be calculated by using a write booster buffer capacity adjustment (bWriteBoosterBufferCapAdjFac) field.

For example, as illustrated in FIG. 13, when the write booster buffer WBB is used as the LU dedicated buffer, the user area UA may be decreased as much as the size calculated according to Equation 7 below.

$$UA_{d1} = bWriteBoosterBufferCapAdjFac *$$
$$dLUNumWriteBoosterBufferAllocUnits * bAllocationUnitSize *$$
$$dSegmentSize * 512 / wCapAdjFacIntModifier$$

[Equation 7]

In Equation 7 above, "UAd1" may indicate the capacity decreased in the user area UA when the write booster buffer WBB is used as the LU dedicated buffer, "bWriteBoosterBufferCapAdjFac" may indicate a write booster buffer capacity adjustment factor, "dLUNumWriteBoosterBufferAllocUnits" may indicate the number of allocation units of a write booster buffer associated with a logical unit, "bAllocationUnitSize" may indicate the size of the allocation unit, "dSegmentSize" may indicate a segment size, and "wCapAdjFacIntModifier" may indicate a capacity adjustment factor integer modifier.

Alternatively, as illustrated in FIG. 13, when the write booster buffer WBB is used as the shared buffer, the user area UA may be decreased as much as the size calculated according to Equation 8 below.

$$UA_{d2} = bWriteBoosterBufferCapAdjFac *$$
$$dNumSharedWriteBoosterBufferAllocUnits *$$
$$bAllocationUnitSize * dSegmentSize *$$
$$512 / wCapAdjFacIntModifier$$

[Equation 8]

In Equation 8 above, "UAd2s" indicates the capacity decreased in the user area UA when the write booster buffer WBB is used as the shared buffer, and "dNumSharedWriteBoosterBufferAllocUnits" indicates the number of allocation units of a shared write booster buffer. The remaining variables are described above, and thus, additional description will be omitted to avoid redundancy.

In an embodiment, the field corresponding to "wCapAdjFacIntModifier" of Equation 7 and Equation 8 may be the capacity adjustment factor integer modifier described with reference to FIGS. 1 to 12. In an embodiment, "bWriteBoosterBufferCapAdjFac" of Equation 7 and Equation 8 may be defined or set to be similar to the capacity adjustment factor described with reference to FIGS. 1 to 12. For example, the write booster buffer WBB may operate in an SLC mode. When the normal memory type of the storage device 1200 is the TLC, as in the above description, "bWriteBoosterBufferCapAdjFac" may be set to "6" (i.e., CapacityAdjFactor(TLC)(3)*CapAdjFacIntModifier(2))".

Alternatively, when the normal memory type of the storage device 1200 is the MLC, as in the above description, "bWriteBoosterBufferCapAdjFac" may be set to "2" (i.e., CapacityAdjFactor(MLC)(2)*CapAdjFacIntModifier(1))".

Alternatively, when the normal memory type of the storage device 1200 is the QLC, as in the above description, "bWriteBoosterBufferCapAdjFac" may be set to "12" (i.e., CapacityAdjFactor(QLC)(4)*CapAdjFacIntModifier(3))".

As described above, the capacity adjustment factor of the write booster buffer WBB may be adjusted to be similar to the capacity adjustment factor described with reference to FIGS. 1 to 12; in this case, the decreased size of the user area UA may be accurately calculated by using the capacity adjustment factor integer modifier.

An embodiment in which the write booster buffer WBB operates in the SLC mode is described, but the present disclosure is not limited thereto. For example, the write booster buffer WBB may be implemented to operate in any other operating mode (e.g., an MLC or TLC mode) or by using any other high-speed memory technology. In this case, the "bWriteBoosterBufferCapAdjFac" field may be set to be similar to the capacity adjustment factor described with reference to FIGS. 1 to 12, and the decreased size of the user area UA may be accurately calculated by using "wCapAdjFacIntModifier".

As described above, according to the related UFS standard, the capacity adjustment factor (CapacityAdjFactor), used in partition setting of the logical unit, is expressed in the form of a decimal fraction with regard to a specific memory type. When the floating point operation is not supported in the host 1100, the capacity adjustment factor of the decimal fraction form is set to an unintended (or incorrect) integer value which does not correspond to the capacity adjustment factor associated with the specific memory type, and an error occurs in the process of calculating the number of allocation units of the logical unit.

Accordingly, in the present disclosure, the capacity adjustment factor for each of memory types defined in the related UFS standard is expressed in the form of an integer by multiplying the capacity adjustment factor and the capacity adjustment factor integer modifier together. Accordingly, the host 1100 may calculate the number of allocation units for each logical unit by using the capacity adjustment factor integer modifier (wCapAdjFacIntModifier) and the capacity adjustment factor expressed in an integer form. In this regard, even though the floating point operation is not supported in the host 1100, a normal calculation is possible because factors required for calculating the number of allocation units for each logical unit are expressed in an integer form.

In the above embodiments, the description is given as the capacity adjustment factor is "1" with respect to the normal memory type. That is, with regard to the same allocation units, the capacity adjustment factor for each memory type is determined based on the storage capacity obtained with the normal memory type. However, the present disclosure is not limited thereto.

For example, the capacity adjustment factor may be set to "1" with regard to the memory type corresponding to the SLC operation. In this case, the capacity adjustment factor may be set to the ratio between the storage capacity obtained with the corresponding memory type and the storage capacity obtained with the memory type corresponding to the SLC operation for the same number of allocation units. For example, the capacity adjustment factor of the first enhanced memory type may be defined according to Equation 9 below.

$$CapacityAdjFactor = \frac{Capacity_{Enhanced1}}{Capacity_{SLC}} \quad \text{[Equation 9]}$$

In Equation 9, "CapacityFactor" may be the capacity adjustment factor of the first enhanced memory type, "Capacity$_{Enhanced1}$" may indicate the storage capacity obtained from the first number of allocation units with the first enhanced memory type, and "Capacity$_{SLC}$" may indicate the storage capacity obtained from the first number of allocation units with the memory type associated with the SLC operation.

When the normal memory type is associated with the QLC operation, the capacity adjustment factor of the normal memory type may be set to "4", the capacity adjustment factor of the memory type associated with the TLC operation may be set to "3", the capacity adjustment factor of the memory type associated with the MLC operation may be set to "2", and the capacity adjustment factor of the memory type associated with the SLC operation may be set to "1". That is, in this case, the capacity adjustment factor for each memory type may be expressed in the form of an integer.

Accordingly, the capacity adjustment factor integer modifier (CapAdjFacIntModifier) may not be required. In this case, the host 1100 may calculate the number of allocation units associated with the logical unit by using Equation 10 below.

$$dNumAllocUnits = \\ \text{CEILING}\left(\frac{LUCapacity \times CapacityAdjFactor_{normal}}{bAllocationUnitSize \times dSegmentSize \times 512 \times CapacityAdjFactor}\right) \quad \text{[Equation 10]}$$

In Equation 10 above, "CapacityAdjFactornormal" may indicate the capacity adjustment factor corresponding to the normal memory type. The remaining variables are similar to those described above, and thus, additional description will be omitted to avoid redundancy. When the number of allocation units associated with the logical unit is calculated like Equation 10, the number of allocation units may be normally calculated. For example, it is assumed that the normal memory type is associated with the QLC operation and a first logical unit is set to a memory type associated with the TLC operation. In this case, the capacity adjustment factor (CapacityAdjFactornormal) corresponding to the normal memory type may be "4", and the capacity adjustment factor (CapacityAdjFactor) corresponding to the memory type associated with the TLC operation may be "3". In this regard, it is assumed that "LUcapacity" indicating the capacity of the first logical unit is 4 GB, "bAllocationUnitSize" indicating the size of the allocation unit is 8, and "dSegmentsize" indicating a segment size is 1024. In this case, the number of allocation units associated with the first logical unit may be calculated according to Equation 11 below with reference to Equation 10 above.

$$dNumAllocUnitsLU1 = \\ \text{CEILING}\left(\frac{4 \text{ Gbyte} \times 4}{8 \times 1024 \times 512 \text{ byte} \times 3}\right) = \\ \text{CEILING}\left(\frac{16 \text{ Gbyte}}{12 \text{ Mbyte}}\right) = 1366 \quad \text{[Equation 11]}$$

Equation 11 is the same as Equation 5 described above. That is, through the above method, the host 1100 may normally calculate the number of allocation units. In an embodiment, information (e.g., INTEGER(256*CapacityAdjFactornormal) about the capacity adjustment factor corresponding to the normal memory type may be stored/set in a reserved field of the geometry descriptor of the storage device 1200.

Figure 14:
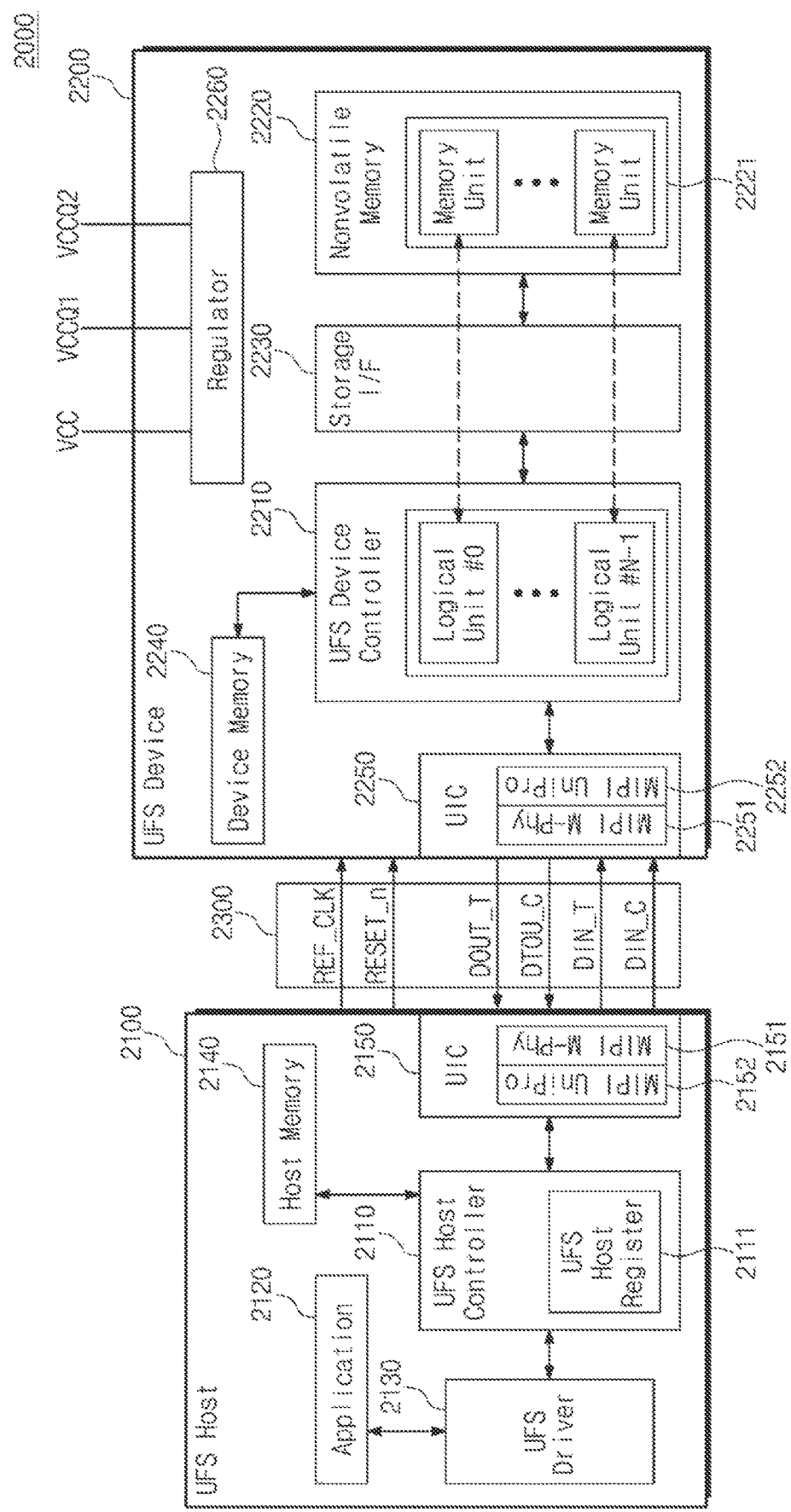
FIG. 14 is a diagram for describing a universal flash storage (UFS) system according to an embodiment.

FIG. 14 is a diagram of a UFS system 2000 according to an embodiment. The UFS system 2000 may be a system conforming to a UFS standard announced by Joint Electron Device Engineering Council (JEDEC) and include a UFS host 2100, a UFS device 2200, and a UFS interface 2300. The above description of the storage system 1000 of FIG. 1 may also be applied to the UFS system 2000 of FIG. 14 within a range that does not conflict with the following description of FIG. 14.

Referring to FIG. 14, the UFS host 2100 may be connected to the UFS device 2200 through the UFS interface 2300. When the host 1100 of FIG. 1 is an AP, the UFS host 2100 may be implemented as a portion of the AP. The UFS host controller 2110 and the host memory 2140 may respectively correspond to the controller 1120 of the host 1100 and the memories 1200*a* and 1200*b* of FIG. 1. The UFS device 2200 may correspond to the storage device 1300*a* and 1300*b* of FIG. 1, and a UFS device controller 2210 and an NVM 2220 may respectively correspond to the storage controllers 1310*a* and 1310*b* and the NVMs 1320*a* and 1320*b* of FIG. 1.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 14, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 14, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine. The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array and a control circuit configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 15A:
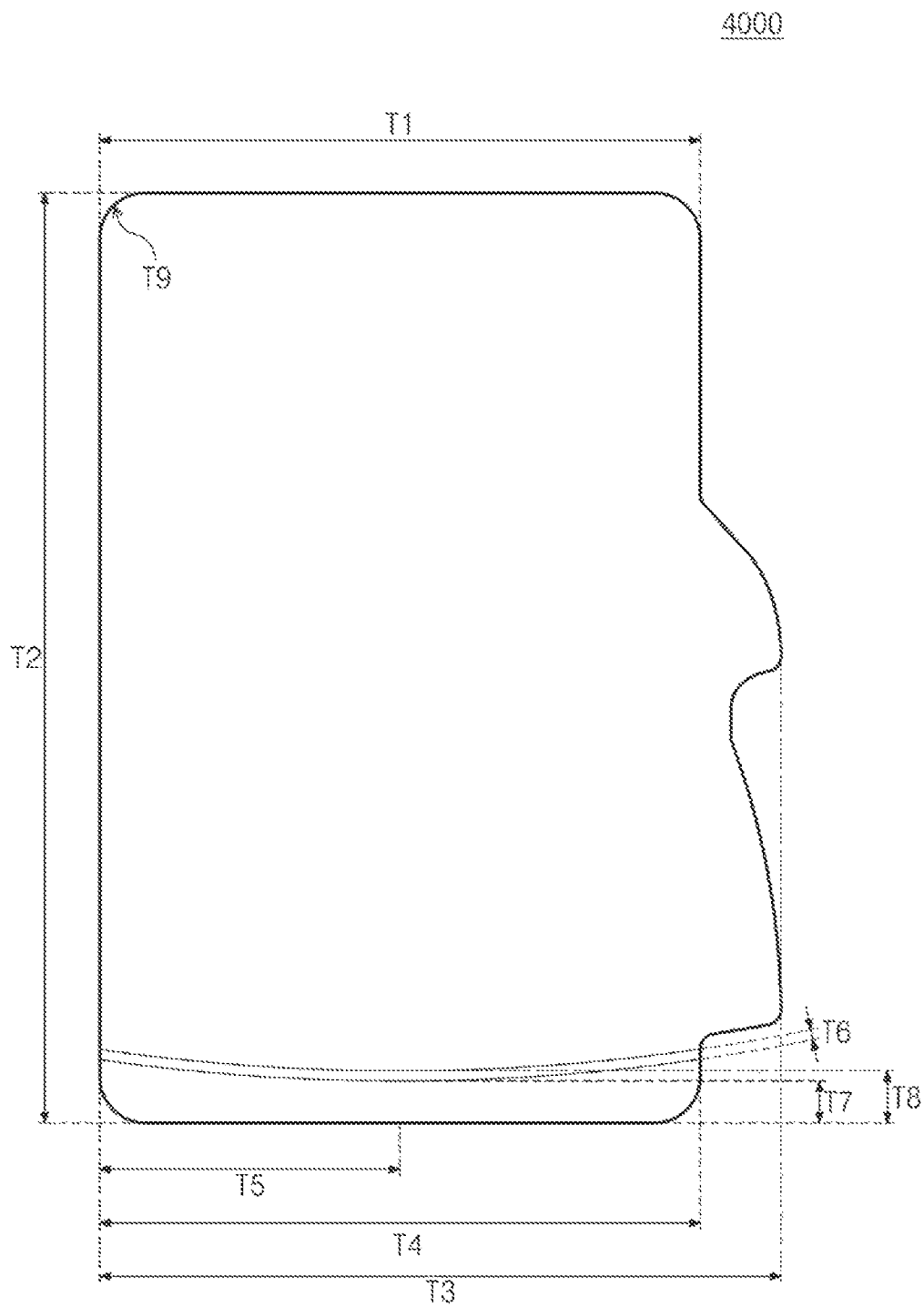
FIGS. 15A, 15B and 15C are diagrams for describing a form factor of an UFS card according to an embodiment.
Figure 15B:
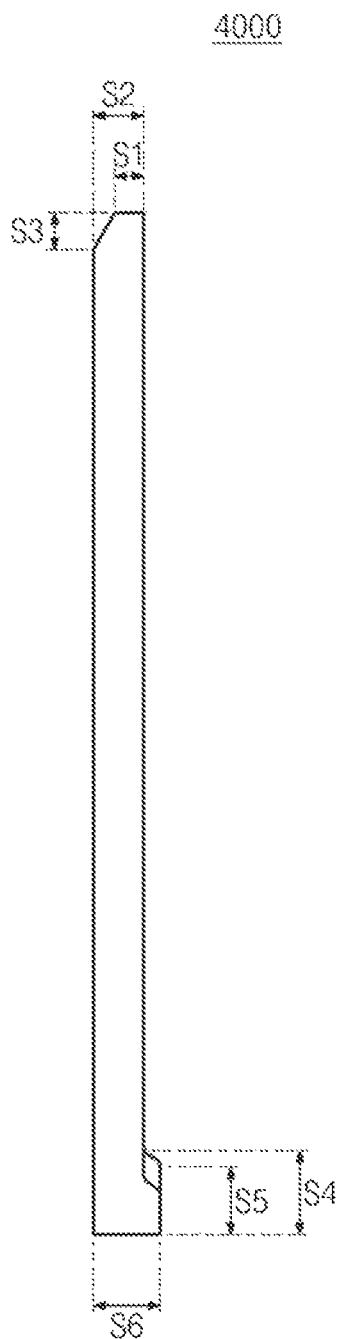
Figure 15C:
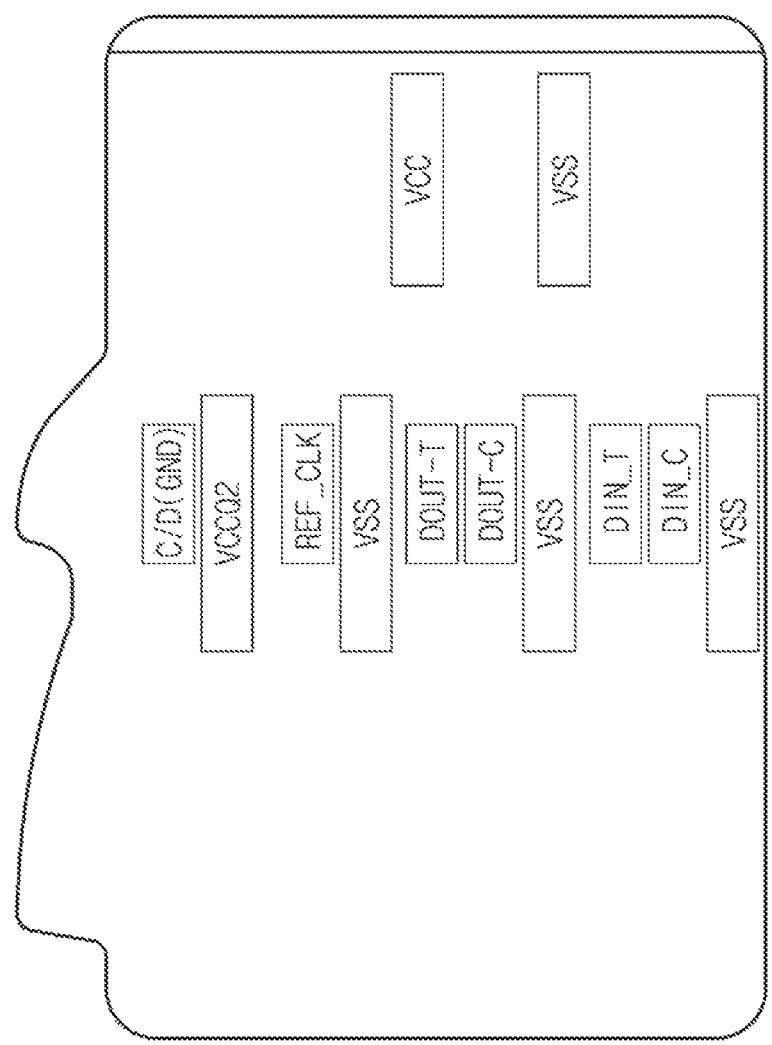

FIGS. 15A to 15C are diagrams of a form factor of a UFS card 4000. When the UFS device 2200 described with reference to FIG. 14 is implemented as the UFS card 4000, an outer appearance of the UFS card 4000 may be as shown in FIGS. 15A to 15C.

FIG. 15A is a top view of the UFS card 4000, according to an example embodiment. Referring to FIG. 15A, it can be seen that the UFS card 4000 entirely follows a shark-shaped design. In FIG. 15A, the UFS card 4000 may have dimensions shown in Table 1 below as an example.

TABLE 1

| Item | Dimension (mm) |
|---|---|
| T1 | 9.70 |
| T2 | 15.00 |
| T3 | 11.00 |
| T4 | 9.70 |
| T5 | 5.15 |
| T6 | 0.25 |
| T7 | 0.60 |
| T8 | 0.75 |
| T9 | R0.80 |

FIG. 15B is a side view of the UFS card 4000, according to an example embodiment. In FIG. 15B, the UFS card 4000 may have dimensions shown in Table 2 below as an example.

TABLE 2

| Item | Dimension (mm) |
|---|---|
| S1 | 0.74 ± 0.06 |
| S2 | 0.30 |
| S3 | 0.52 |
| S4 | 1.20 |
| S5 | 1.05 |
| S6 | 1.00 |

FIG. 15C is a bottom view of the UFS card 4000, according to an example embodiment. Referring to FIG. 15C, a plurality of pins for electrical contact with a UFS slot may be formed on a bottom surface of the UFS card 4000. Functions of each of the pins will be described below. Based on symmetry between a top surface and the bottom surface of the UFS card 4000, some pieces (e.g., T1 to T5 and T9) of information about the dimensions described with reference to FIG. 15A and Table 1 may also be applied to the bottom view of the UFS card 400, which is shown in FIG. 15C.

A plurality of pins for an electrical connection with a UFS host may be formed on the bottom surface of the UFS card 4000. Referring to FIG. 15C, a total number of pins may be 12. Each of the pins may have a rectangular shape, and signal names corresponding to the pins may be as shown in FIG. 15C. Specific information about each of the pins will be understood with reference to Table 3 below and the above description presented with reference to FIG. 14.

TABLE 3

| No. | Signal Name | Description | Dimension (mm) |
|---|---|---|---|
| 1 | Vss | Ground (GND) | 3.00 × 0.72 ± 0.05 |
| 2 | DIN_C | Differential input signals input from a host to the UFS | 1.50 × 0.72 ± 0.05 |
| 3 | DIN_T | card 4000 (DIN_C is a negative node, and DIN_T is a positive node) | |
| 4 | Vss | Ground (GND) | 3.00 × 0.72 ± 0.05 |
| 5 | DOUT_C | Differential output signals output from the UFS card | 1.50 × 0.72 ± 0.05 |
| 6 | DOUT_T | 4000 to the host (DOUT_C is a negative node, and DOUT_T is a positive node) | |
| 7 | Vss | Ground (GND) | 3.00 × 0.72 ± 0.05 |
| 8 | REF_CLK | Reference clock signal provided from the host to the UFS card 4000 | 1.50 × 0.72 ± 0.05 |
| 9 | VCCQ2 | Power supply voltage provided mainly to a PHY interface or a controller and having a lower value than voltage Vcc | 3.00 × 0.72 ± 0.05 |
| 10 | C/D(GND) | Card detection signal | 1.50 × 0.72 ± 0.05 |
| 11 | Vss | Ground (GND) | 3.00 × 0.80 ± 0.05 |
| 12 | Vcc | Main power supply voltage | |

Figure 16:
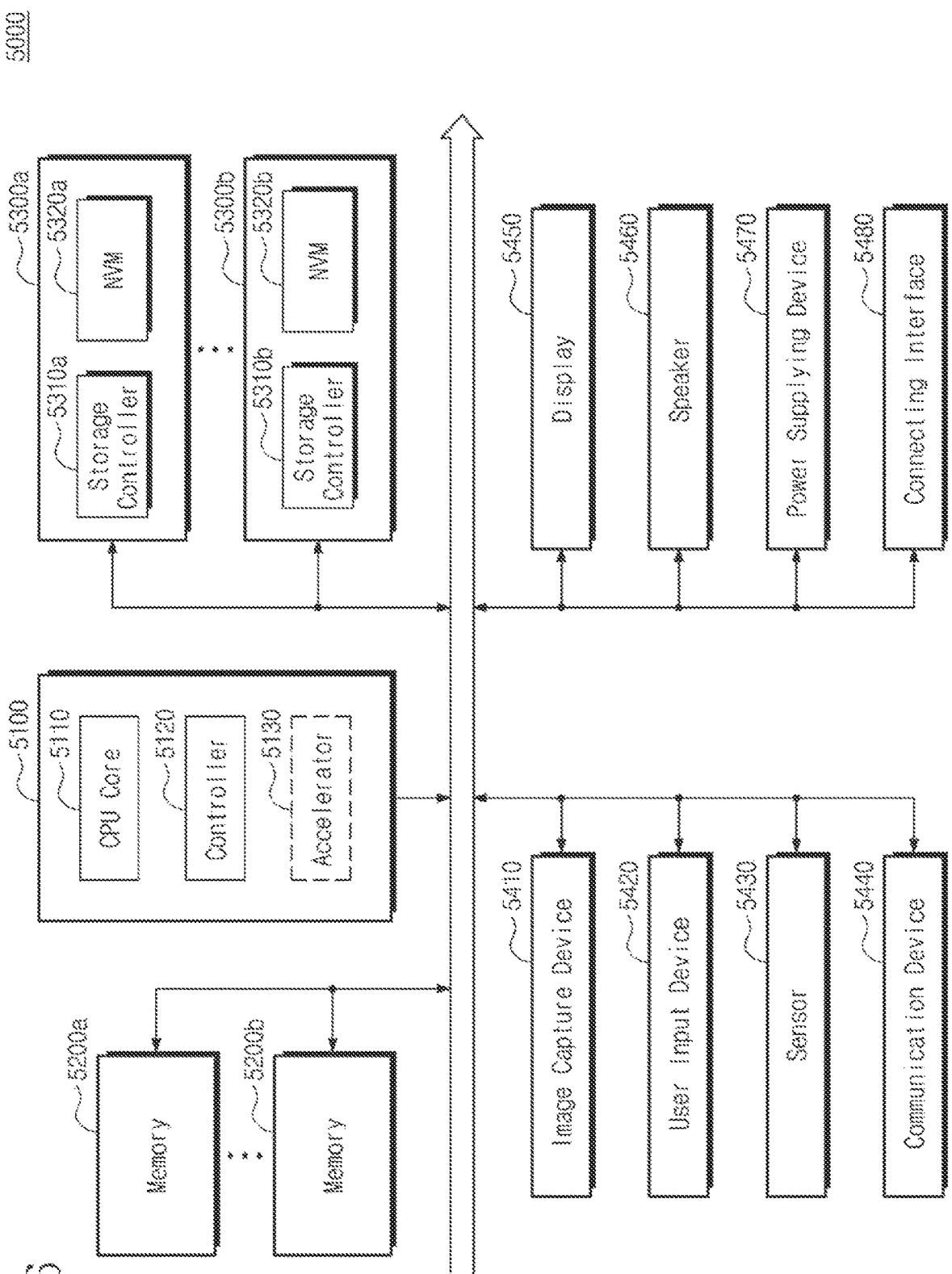
FIG. 16 is a diagram illustrating a system to which a storage device according to an embodiment is applied.

FIG. 16 is a diagram of a system 5000 to which a storage device is applied, according to an embodiment. The system 5000 of FIG. 16 may basically be a mobile system, such as a portable communication terminal (e.g., a mobile phone), a smartphone, a tablet personal computer (PC), a wearable device, a healthcare device, or an Internet of things (IoT) device. However, the system 5000 of FIG. 16 is not necessarily limited to the mobile system and may be a PC, a laptop computer, a server, a media player, or an automotive device (e.g., a navigation device).

Referring to FIG. 16, the system 5000 may include a main processor 500, memories (e.g., AAA200a and AAA200b), and storage devices (e.g., 5300a and 5300b). In addition, the system 5000 may include at least one of an image capturing device 5410, a user input device 5420, a sensor 5430, a communication device 5440, a display AAA 1450, a speaker 5460, a power supplying device 5470, and a connecting interface 5480.

The main processor 5100 may control all operations of the system 5000, more specifically, operations of other components included in the system 5000. The main processor 5100 may be implemented as a general-purpose processor, a dedicated processor, or an application processor.

The main processor 5100 may include at least one CPU core 5110 and further include a controller 5120 configured to control the memories 5200a and 5200b and/or the storage devices 5300a and 5300b. In some embodiments, the main processor 5100 may further include an accelerator 5130, which is a dedicated circuit for a high-speed data operation, such as an artificial intelligence (AI) data operation. The accelerator 5130 may include a graphics processing unit (GPU), a neural processing unit (NPU) and/or a data processing unit (DPU) and be implemented as a chip that is physically separate from the other components of the main processor 5100.

The memories 5200a and 5200b may be used as main memory devices of the storage system 1000. Although each of the memories 5200a and 5200b may include a volatile memory, such as static random access memory (SRAM) and/or dynamic RAM (DRAM), each of the memories 5200a and 5200b may include non-volatile memory, such as a flash memory, phase-change RAM (PRAM) and/or resistive RAM (RRAM). The memories 5200a and 5200b may be implemented in the same package as the main processor 5100.

The storage devices 5300a and 5300b may serve as non-volatile storage devices configured to store data regardless of whether power is supplied thereto, and have larger storage capacity than the memories 5200a and 5200b. The storage devices 5300a and 5300b may respectively include storage controllers (STRG CTRL) 5310a and 5310b and NVM (Non-Volatile Memory)s 5320a and 5320b configured to store data via the control of the storage controllers 5310a and 5310b. Although the NVMs 5320a and 5320b may include flash memories having a two-dimensional (2D) structure or a three-dimensional (3D) V-NAND structure, the NVMs 5320a and 5320b may include other types of NVMs, such as PRAM and/or RRAM.

The storage devices 5300a and 5300b may be physically separated from the main processor 5100 and included in the system 5000 or implemented in the same package as the main processor 5100. In addition, the storage devices 5300a and 5300b may have types of solid-state devices (SSDs) or memory cards and be removably combined with other components of the system 5000 through an interface, such as the connecting interface 5480 that will be described below. The storage devices 5300a and 5300b may be devices to which a standard protocol, such as a universal flash storage (UFS), an embedded multi-media card (eMMC), or a non-volatile memory express (NVMe), is applied, without being limited thereto.

The image capturing device 5410 may capture still images or moving images. The image capturing device 5410 may include a camera, a camcorder, and/or a webcam.

The user input device 5420 may receive various types of data input by a user of the system 5000 and include a touch pad, a keypad, a keyboard, a mouse, and/or a microphone.

The sensor 5430 may detect various types of physical quantities, which may be obtained from the outside of the system 5000, and convert the detected physical quantities into electric signals. The sensor 5430 may include a temperature sensor, a pressure sensor, an illuminance sensor, a position sensor, an acceleration sensor, a biosensor, and/or a gyroscope sensor.

The communication device 5440 may transmit and receive signals between other devices outside the system 5000 according to various communication protocols. The communication device 5440 may include an antenna, a transceiver, and/or a modem.

The display 5450 and the speaker 5460 may serve as output devices configured to respectively output visual information and auditory information to the user of the system 5000.

The power supplying device 5470 may appropriately convert power supplied from a battery embedded in the system 5000 and/or an external power source, and supply the converted power to each of components of the system 5000.

The connecting interface 5480 may provide connection between the system 5000 and an external device, which is connected to the system 5000 and capable of transmitting and receiving data to and from the system 5000. The connecting interface 5480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

In an embodiment, the storage devices 1300a and 1300b may be the storage device described with reference to FIGS. 1 to 15C, and the main processor 5100 may be the host device described with reference to FIGS. 1 to 15C. The storage devices 1300a and 1300b and the main processor 5100 may operate based on the methods described with reference to FIGS. 1 to 15C.

According to embodiments, as a capacity adjustment factor (CapacityAdjFactor), used in partition setting of logical units of a storage device, is modified in the form of an integer, normal partition setting is possible in a host where a floating point operation is not supported. Accordingly, an operation method of a storage device with improved reliability, an operation method of a host, and an operation method of a storage system are provided.

In some embodiments, each of the components represented by a block as illustrated in FIGS. 1, 2, 14 and 16 may be implemented as various numbers of hardware, software and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of embodiments have been particularly shown and described, it will be understood that various changes in form and details may be made therein without departing from the spirit and scope of the following claims.

What is claimed is:

1. A method of operating a storage system which includes a host and a storage device, the method comprising:
   transmitting, by the host, a first query request universal flash storage protocol information unit (UPIU) to the storage device;
   transmitting, by the storage device, a first query response UPIU corresponding to the first query request UPIU to the host in response to the first query request UPIU;
   identifying, by the host, a number of first allocation units corresponding to a first logical unit set to a first memory type, based on a first capacity adjustment factor and a capacity adjustment factor integer modifier included in the first query response UPIU;
   transmitting, by the host, a second query request UPIU including the number of first allocation units to the storage device; and
   writing, by the storage device, the number of first allocation units in a configuration descriptor and transmitting a second query response UPIU to the host, in response to the second query request UPIU,
   wherein the first capacity adjustment factor corresponds to a product of a first ratio and the capacity adjustment factor integer modifier, the first ratio being between a first capacity of a normal memory type of the storage device and a second capacity of the first memory type.

2. The method of claim 1, wherein the first query request UPIU is a standard read request for reading a geometry descriptor of the storage device.

3. The method of claim 2, wherein the first query response UPIU includes the geometry descriptor, and
   wherein the geometry descriptor includes:
   a first field corresponding to the first capacity adjustment factor; and
   a second field corresponding to the capacity adjustment factor integer modifier.

4. The method of claim 3, wherein the first field is set based on Equation 1 below, $$wEnhanced1CapAdjFac = \text{INTEGER}(256 \times CapacityAdjFactor)$$ [Equation 1]

-continued $$CapacityAdjFactor = \frac{Capacity_{NormalMem}}{Capacity_{Enhanced1}} \times wCapAdjFacIntModifier$$

wherein the "wEnhanced1CapAdjFac" indicates a value of the first field, the "$Capacity_{NormalMem}$" indicates the first capacity obtained with the normal memory type for the first allocation units, the "$Capacity_{Enhanced1}$" indicates the second capacity obtained with the first memory type for the first allocation units, the "wCapAdjFacIntModifier" indicates the capacity adjustment factor integer modifier, and the "CapacityAdjFactor" indicates the first capacity adjustment factor.

5. The method of claim 4, wherein the identifying the number of the first allocation units corresponding to the first logical unit by the host is performed based on Equation 2 below, $$dNumAllocUnits = \text{CEILING}\left(\frac{LUCapacity \times CapacityAdjFactor}{bAllocationUnitSize \times dSegmentSize \times 512 \times wCapAdjFacIntModifier}\right)$$ [Equation 2]

wherein the "LUCapacity" indicates a storage capacity set to the first logical unit, the "bAllocationUnitSize" indicates an allocation unit size, and the "dSegmentSize" indicates a segment size, and
wherein the "CapacityAdjFactor" is identified based on the value of the first field and has an integer form.

6. The method of claim 1, wherein the second query request UPIU is a standard write request for writing the configuration descriptor.

7. The method of claim 1, wherein the first memory type is one of an enhanced memory type, a system code type, and a non-persistent type.

8. The method of claim 1, wherein the normal memory type is a memory type in which each of a plurality of memory cells included in the storage device stores "M" bits (M being a natural number of 4 or more), and
wherein the first memory type is a memory type in which each of the plurality of memory cells included in the storage device stores "N" bits (N being a natural number less than M).

9. The method of claim 8, wherein the capacity adjustment factor integer modifier is a least common multiple of natural numbers that are not divisors of the "M" from among natural numbers less than the "M".

10. The method of claim 8, wherein the "M" is 4, the "N" is 3, and the capacity adjustment factor integer modifier is "3".

11. The method of claim 1, wherein the storage device is a universal flash storage (UFS) card or an embedded UFS device.

12. A method of operating a host which is configured to control a storage device, the method comprising:
   obtaining a geometry descriptor from the storage device;
   identifying a number of first allocation units for a first logical unit of the storage device, based on a first capacity adjustment factor generated based on a value of each of a first field and a second field included in the geometry descriptor; and
   writing first information about the identified number of the first allocation units in a configuration descriptor of the storage device, wherein the first logical unit is set to a first memory type which stores "N" bits in each of memory cells of the storage device (N being a natural number), and wherein the first field includes a value corresponding to a product of the first capacity adjustment factor and a value of the second field.

13. The method of claim 12, wherein the first field has one of offsets of 24h, 2Ah, 30h, 36h, 3Ch, and 42h, in the geometry descriptor.

14. The method of claim 12, wherein the identifying the number of the first allocation units is performed based on Equation 1 below, $$dNumAllocUnits = \text{CEILING}\left(\frac{LUCapacity \times CapacityAdjFactor}{bAllocationUnitSize \times dSegmentSize \times 512 \times wCapAdjFacIntModifier}\right) \quad \text{[Equation 1]}$$

wherein the "dNumAllocUnits" indicates the number of first allocation units for the first logical unit, the "bAllocationUnitSize" indicates an allocation unit size, the "dSegmentSize" indicates a segment size, the "LUCapacity" indicates a capacity of the first logical unit, the "CapacityAdjFactor" indicates the first capacity adjustment factor, and the "wCapAdjFacIntModifier" indicates the value of the second field.

15. The method of claim 12, wherein the obtaining the geometry descriptor from the storage device comprises:
transmitting, to the storage device, a first query request universal flash storage protocol information unit (UPIU) comprising a standard read request for reading the geometry descriptor; and
receiving a first query response UPIU including the geometry descriptor from the storage device.

16. The method of claim 12, wherein the writing the first information about the identified number of the first allocation units in the configuration descriptor of the storage device comprises:
transmitting a second query request UPIU including the identified number of the first allocation units to the storage device; and
receiving a second query response UPIU corresponding to the second query request UPIU from the storage device, and
wherein the second query request UPIU is a standard write request for writing the configuration descriptor.

17. A method of operating a host which is configured to control a storage device, the method comprising:
obtaining a first enhanced memory type adjustment factor for a first enhanced memory type from the storage device;
obtaining a first capacity adjustment factor, based on the first enhanced memory type adjustment factor;
calculating a number of first allocation units for a first logical unit of the storage device based on Equation 1 below; and
writing the calculated number of the first allocation units in the storage device, to set a first partition of the first logical unit of the storage device, $$dNumAllocUnits = \text{CEILING}\left(\frac{LUCapacity \times CapacityAdjFactor}{bAllocationUnitSize \times dSegmentSize \times 512 \times wCapAdjFacIntModifier}\right) \quad \text{[Equation 1]}$$

wherein the "dNumAllocUnits" indicates the number of the first allocation units for the first logical unit, the "bAllocationUnitSize" indicates an allocation unit size, the "dSegmentSize" indicates a segment size, the "LUCapacity" indicates a capacity of the first logical unit, the "CapacityAdjFactor" indicates the first capacity adjustment factor, and the "wCapAdjFacIntModifier" indicates a capacity adjustment factor integer modifier.

18. The method of claim 17, wherein the first capacity adjustment factor is determined based on Equation 2 below, $$CapacityAdjFactor = \frac{Capacity_{NormalMem}}{Capacity_{Enhanced1}} \times wMediumTypeCapAdjFac \quad \text{[Equation 2]}$$

wherein the "$Capacity_{NormalMem}$" indicates a first capacity obtained with a normal memory type for the first allocation units, and the "$Capacity_{Enhanced1}$" indicates a second capacity obtained with the first enhanced memory type for the first allocation units.

19. The method of claim 18, wherein the normal memory type is associated with an operation of storing "M" bits per cell (M being a natural number of 2 or more), in the storage device, and
wherein the first enhanced memory type is associated with an operation of storing "N" bits per cell (N being a natural number less than M), in the storage device.

20. The method of claim 19, wherein the "M" is 4, the "N" is 3, and the capacity adjustment factor integer modifier is "3".

* * * * *